United States Patent
Zhang et al.

(10) Patent No.: US 12,095,256 B2
(45) Date of Patent: Sep. 17, 2024

(54) FAULT ISOLATION APPARATUS, DIRECT CURRENT BOOST APPARATUS, AND INVERTER APPARATUS

(71) Applicant: Huawei Digital Power Technologies Co., Ltd., Shenzhen (CN)

(72) Inventors: Fangpo Zhang, Shanghai (CN); Jun Wang, Shanghai (CN); Tiansan Lin, Shanghai (CN); Houjian Xu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 364 days.

(21) Appl. No.: 17/589,316

(22) Filed: Jan. 31, 2022

(65) Prior Publication Data
US 2022/0158443 A1 May 19, 2022

Related U.S. Application Data

(63) Continuation of application No. PCT/CN2020/095447, filed on Jun. 10, 2020.

(30) Foreign Application Priority Data

Aug. 1, 2019 (CN) .......................... 201910707048.9

(51) Int. Cl.
*H02H 7/12* (2006.01)
*H02M 1/32* (2007.01)
*H02M 3/158* (2006.01)

(52) U.S. Cl.
CPC ............ *H02H 7/1213* (2013.01); *H02M 1/32* (2013.01); *H02M 3/158* (2013.01)

(58) Field of Classification Search
CPC ...... H02M 3/158; H02M 3/1584; H02M 1/32; H02H 3/087; H02H 3/18; H02H 7/1213
(Continued)

(56) References Cited

U.S. PATENT DOCUMENTS

2011/0301772 A1* 12/2011 Zuercher ........... H01L 31/02021
700/292
2012/0174961 A1* 7/2012 Larson ............... H01L 31/02021
136/246
(Continued)

FOREIGN PATENT DOCUMENTS

CN 102789932 A 11/2012
CN 102867712 A 1/2013
(Continued)

OTHER PUBLICATIONS

Machine translation of Korean Patent Document Jeong et al. KR 2016-0146398 A Dec. 2016 (Year: 2016).*
(Continued)

*Primary Examiner* — Kevin J Comber
(74) *Attorney, Agent, or Firm* — Leydig, Voit & Mayer, Ltd.

(57) ABSTRACT

A fault isolation apparatus includes a controller and a circuit breaker. When the circuit breaker is located on a bus connected to a DC/DC conversion unit, if a voltage collected by a first voltage collection terminal is a negative value, it indicates that input or output of the DC/DC conversion unit is reversely connected. In this case, if the circuit breaker is controlled to be opened, the DC/DC conversion unit can be prevented from being connected in series to other parallel DC/DC conversion units. If a voltage collected by a first voltage collection terminal is low and a current collected by a current collection terminal is large, it indicates that the DC/DC conversion unit is short-circuited. In this case, if the circuit breaker is controlled to be opened, another component connected in series to the DC/DC conversion unit can also be prevented from backfeeding energy to the DC/DC conversion unit.

14 Claims, 27 Drawing Sheets

(58) Field of Classification Search
USPC .......................................................... 361/91.1
See application file for complete search history.

(56) References Cited

U.S. PATENT DOCUMENTS

2013/0264883 A1  10/2013  Bhavaraju et al.
2018/0006562 A1   1/2018  Jiang et al.

FOREIGN PATENT DOCUMENTS

| CN | 102868148 | A |   | 1/2013  |            |
|----|-----------|---|---|---------|------------|
| CN | 103532489 | A |   | 1/2014  |            |
| CN | 204652311 | U |   | 9/2015  |            |
| CN | 206149209 | U | * | 5/2017  |            |
| CN | 110571847 | A |   | 12/2019 |            |
| JP | 2012244769| A |   | 12/2012 |            |
| KR | 2016146398| A | * | 12/2016 | G01R 19/165|
| KR | 20160146398| A |   | 12/2016 |            |

OTHER PUBLICATIONS

Machine translation of Sun et al. Chinese Patent Document CN 206149209 U May 2017 (Year: 2017).*

* cited by examiner

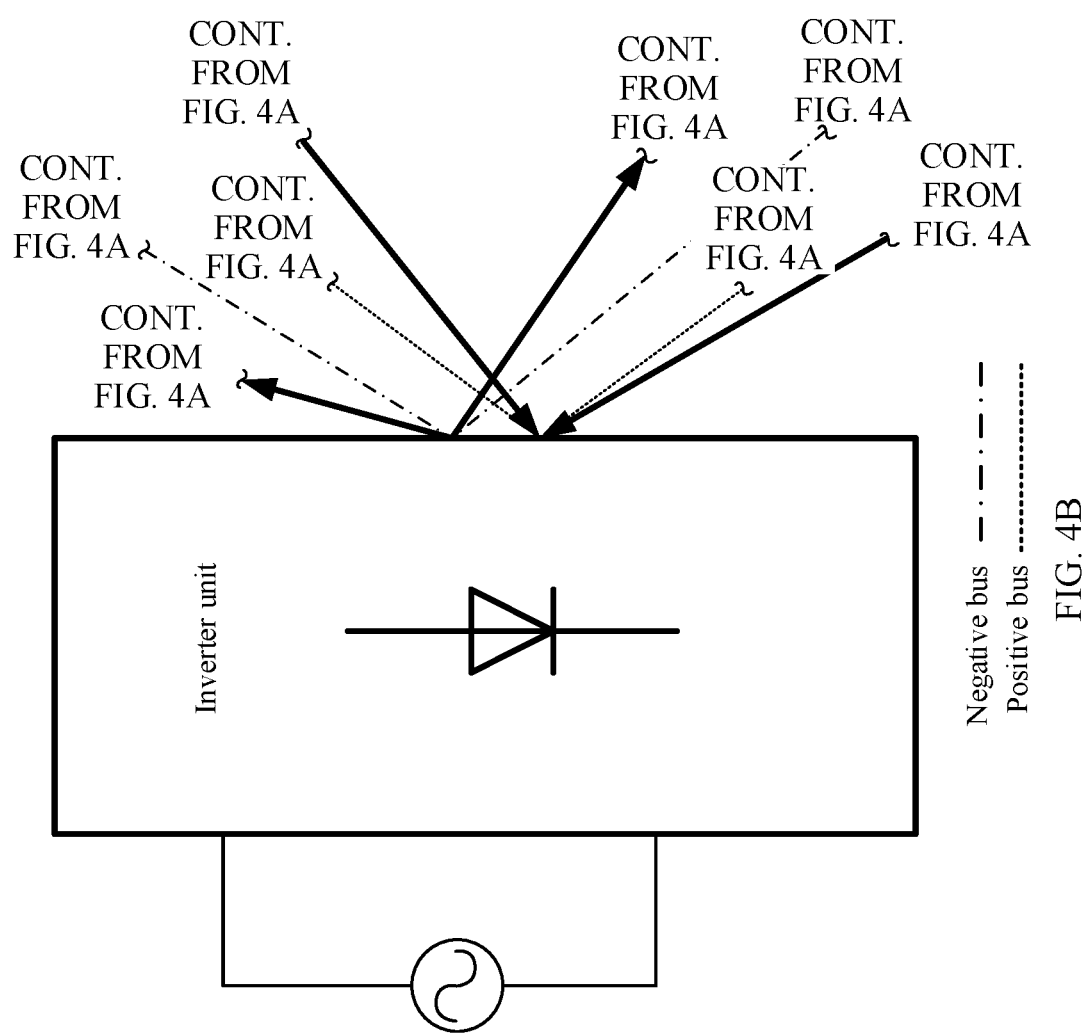

FAULT ISOLATION APPARATUS, DIRECT CURRENT BOOST APPARATUS, AND INVERTER APPARATUS

CROSS-REFERENCE TO RELATED APPLICATIONS

This application is a continuation of International Application No. PCT/CN2020/095447, filed on Jun. 10, 2020, which claims priority to Chinese Patent Application No. 201910707048.9, filed on Aug. 1, 2019. The disclosures of the aforementioned applications are hereby incorporated by reference in their entireties.

TECHNICAL FIELD

This application relates to the field of photovoltaic technologies, and in particular, to a fault isolation apparatus, a direct current boost apparatus, and an inverter apparatus.

BACKGROUND

In a power supply system based on a photovoltaic technology, a direct current generated by a photovoltaic battery is first boosted by using a direct current boost apparatus, and then converted into an alternating current by using an inverter unit. Then, the alternating current obtained after conversion is sent to a power grid. The direct current boost apparatus generally includes a plurality of Direct Current/Direct Current (DC/DC) conversion units connected in parallel. If any DC/DC conversion unit is faulty, energy of another DC/DC conversion unit may be backfed to the DC/DC conversion unit. Consequently, a cascading failure also occurs in the another DC/DC conversion unit. Therefore, a fault isolation apparatus needs to be studied to isolate the faulty DC/DC conversion unit.

In a related technology, as shown in FIG. 1A, a reverse diode D is connected between an output positive bus and an output negative bus of each DC/DC conversion unit, and a circuit breaker K and a fuse are further connected in series on the output positive bus. The first DC/DC conversion unit is used as an example for description. When the output positive bus and the output negative bus work normally, the diode D is in a reverse cut-off state, and a current enters an inverter unit through the circuit breaker K and the fuse. When the output positive bus and the output negative bus are reversely connected, that is, when the output positive bus is connected to a negative bus input terminal of the inverter unit, and the output negative bus is connected to a positive bus input terminal of the inverter unit, energy of another DC/DC conversion unit is backfed to the first DC/DC conversion unit, and a flow direction of the backfed energy is shown as a direction indicated by a line with an arrow in FIG. TA and FIG. 1B. Consequently, the diode D is in a turn-on state, and a short-circuit fault occurs in the first DC/DC conversion unit. Therefore, if it is detected that there is a current on the diode D, the circuit breaker K is actively opened, so that the energy of the another DC/DC conversion unit is prevented from being backfed to the first DC/DC conversion unit, to implement fault isolation for the first DC/DC conversion unit. In addition, when the short-circuit fault shown in FIG. TA and FIG. 1B occurs, a current on the output positive bus of the first DC/DC conversion unit increases sharply. In this case, the fuse is blown, so that fault isolation can also be implemented for the first DC/DC conversion unit.

In FIG. TA and FIG. 1B, fault isolation is implemented for each DC/DC conversion unit by using the diode D and the circuit breaker K or the diode D and the fuse that are on the output positive bus and the output negative bus of the DC/DC conversion unit. This fault isolation manner is generally applied to a short-circuit fault caused because output of the DC/DC conversion unit is reversely connected, and cannot be effectively used to perform fault isolation on a short-circuit fault caused by another reason. As a result, application flexibility of the fault isolation manner is low.

SUMMARY

This application provides a fault isolation apparatus, a direct current boost apparatus, and an inverter apparatus, to improve application flexibility of the fault isolation apparatus. Technical solutions are as follows:

According to a first aspect, a fault isolation apparatus is provided, where the apparatus includes a controller and a circuit breaker. The controller includes a control terminal, a first voltage collection terminal, and a current collection terminal, and the control terminal of the controller is connected to the circuit breaker.

The circuit breaker is located on a bus connected to a DC/DC conversion unit in a power supply system, and the circuit breaker is configured to: when the circuit breaker is closed, control the bus on which the circuit breaker is located to be connected, or when the circuit breaker is opened, control the bus on which the circuit breaker is located to be disconnected.

The first voltage collection terminal of the controller is configured to collect a voltage on the bus on which the circuit breaker is located, and the current collection terminal of the controller is configured to collect a current on the bus on which the circuit breaker is located. The control terminal of the controller is configured to: when it is detected that the voltage collected by the first voltage collection terminal is a negative value, or when it is detected that the voltage collected by the first voltage collection terminal is lower than a voltage threshold and the current collected by the current collection terminal is higher than a current threshold, control the circuit breaker to be in an off state.

The fault isolation apparatus provided in this application has at least the following technical effects:

First, the circuit breaker is located on a bus connected to a DC/DC conversion unit in the power supply system. Therefore, if the voltage collected by the first voltage collection terminal is a negative value, it indicates that input or output of the DC/DC conversion unit is reversely connected. In this case, if the circuit breaker is controlled to be opened, the DC/DC conversion unit can be prevented from being connected in series to other parallel DC/DC conversion units, so that the another DC/DC conversion unit can be effectively prevented from backfeeding energy to the DC/DC conversion unit. In other words, the fault isolation apparatus provided in this embodiment of this application can effectively perform fault isolation on an input reverse connection fault or an output reverse connection fault of the DC/DC conversion unit.

Second, if the voltage collected by the first voltage collection terminal is low and the current collected by the current collection terminal is large, it indicates that the DC/DC conversion unit is short-circuited. In this case, if the circuit breaker is controlled to be opened, another component connected in series to the DC/DC conversion unit can also be prevented from backfeeding energy to the DC/DC conversion unit. Therefore, the fault isolation apparatus provided in this embodiment of this application can further effectively perform fault isolation on a short-circuit fault of the DC/DC conversion unit, to improve application flexibility of the fault isolation apparatus.

Third, in this application, when fault isolation needs to be performed on a DC/DC conversion unit, the controller may be used to implement fault isolation for the DC/DC conversion unit only by deploying a circuit breaker on a bus connected to the DC/DC conversion unit in an original power supply system. However, in a related technology, to implement fault isolation, both a circuit breaker and a diode or both a diode and a fuse need to be deployed. It is clearly that, according to the fault isolation apparatus provided in this application, no additional diode needs to be deployed in the power supply system, and no fuse needs to be used, so that costs of reconstructing the original power supply system are reduced.

Fourth, an appropriate model needs to be selected in advance for the diode used in the related technology. If the selected model is not appropriate, the diode is easily damaged when output is reversely connected. When the diode is damaged, fault isolation cannot be performed by using the diode in the related technology. However, in this application, a fault does not need to be detected by using the diode. Instead, a fault is directly detected based on a voltage or a current that is collected by the controller. Fault isolation can be implemented provided that a voltage and a current on the bus can be collected. Therefore, reliability of the fault isolation apparatus provided in this application is also high.

In a possible example, the apparatus further includes a self-lock apparatus of the circuit breaker, the self-lock apparatus includes an input terminal and an output terminal, and the control terminal of the controller includes a first control terminal. The input terminal of the self-lock apparatus is connected to the first control terminal of the controller, and the output terminal of the self-lock apparatus is connected to the circuit breaker.

The first control terminal of the controller is configured to: when the circuit breaker is in the off state, and it is detected that the voltage collected by the first voltage collection terminal is a negative value, deliver a first instruction to the input terminal of the self-lock apparatus, to instruct the self-lock apparatus to control the off state of the circuit breaker to be locked.

In this application, with a self-lock function of the circuit breaker, an input reverse connection or output reverse connection fault can be detected before the circuit breaker is closed, to avoid fault spread caused by closing the circuit breaker in case of a fault.

In a possible example, the apparatus further includes a trip apparatus of the circuit breaker, the trip apparatus includes an input terminal and an output terminal, and the control terminal of the controller includes a second control terminal. The input terminal of the trip apparatus is connected to the second control terminal of the controller, and the output terminal of the trip apparatus is connected to the circuit breaker.

The second control terminal of the controller is specifically configured to: when it is detected that the voltage collected by the first voltage collection terminal is lower than the voltage threshold and the current collected by the current collection terminal is higher than the current threshold, send a second instruction to the input terminal of the trip apparatus, to instruct the trip apparatus to control the circuit breaker to be switched from a close state to the off state.

When a short-circuit fault of the DC/DC conversion unit is detected, the circuit breaker is in the close state. Therefore, when the fault occurs, the circuit breaker may be switched from the close state to the off state by using the trip apparatus.

In a possible example, the first voltage collection terminal of the controller is configured to be connected to a voltage detector deployed on the bus on which the circuit breaker is located. The voltage collected by the first voltage collection terminal of the controller is a voltage reported by the voltage detector on the bus on which the circuit breaker is located.

In a possible example, the current collection terminal of the controller is configured to be connected to a current detector deployed on the bus on which the circuit breaker is located.

The current collected by the current collection terminal of the controller is a current reported by the current detector on the bus on which the circuit breaker is located.

In a possible example, the current collection terminal of the controller is configured to be connected to a current detector deployed on each DC/DC converter in a plurality of DC/DC converters included in the DC/DC conversion unit.

The current collected by the current collection terminal of the controller is a sum of currents reported by the current detectors on all the DC/DC converters in the plurality of DC/DC converters.

A current detector and a voltage detector are already deployed on each line in the original power supply system. Therefore, in this application, a current and a voltage may be obtained by using the original current detector and the original voltage detector in the power supply system. This further reduces costs of the fault isolation apparatus.

In a possible example, the circuit breaker is located on an input bus connected to an input terminal of the DC/DC conversion unit.

In this application, the circuit breaker may be specifically deployed on an input side of the DC/DC conversion unit, and is configured to perform fault isolation on an input reverse connection fault of the DC/DC conversion unit and a short circuit of the DC/DC conversion unit.

In a possible example, the controller further includes a second voltage collection terminal. The second voltage collection terminal is configured to collect a voltage on an output bus connected to an output terminal of the DC/DC conversion unit. The control terminal of the controller is further configured to: when it is detected that the voltage collected by the second voltage collection terminal is a negative value, control the circuit breaker to be in the off state.

When the circuit breaker is specifically deployed on the input side of the DC/DC conversion unit, a voltage on an output side of the DC/DC conversion unit may be further collected. In this case, the fault isolation apparatus may implement fault isolation for an input reverse connection, an output reverse connection, and a short circuit.

In a possible example, the apparatus further includes an auxiliary source.

The auxiliary source is separately connected to other components in the fault isolation apparatus, and is configured to supply power to the other components.

The auxiliary source is configured to be connected to the input bus connected to the input terminal of the DC/DC conversion unit. The auxiliary source is further configured to be connected to an output bus connected to an output terminal of the DC/DC conversion unit.

When the circuit breaker is specifically deployed on the input side of the DC/DC conversion unit, the fault isolation apparatus may be integrated into the DC/DC conversion unit. In this case, the auxiliary source may bidirectionally obtain power from the input side or/and an output side of the DC/DC conversion unit, to ensure working stability of the fault isolation apparatus.

In a possible example, the circuit breaker is located on an output bus connected to an output terminal of the DC/DC conversion unit.

In this application, the circuit breaker may be specifically deployed on an output side of the DC/DC conversion unit, and is configured to perform fault isolation on an output reverse connection of the DC/DC conversion unit and a short circuit of the DC/DC conversion unit.

In a possible example, the apparatus further includes an auxiliary source. The auxiliary source is separately connected to other components in the fault isolation apparatus, and is configured to supply power to the other components. The auxiliary source is configured to be connected to a power grid of the power supply system. The auxiliary source is further configured to be connected to a bus connected to an input terminal of an inverter unit in the power supply system.

When the circuit breaker is specifically deployed on the output side of the DC/DC conversion unit, the fault isolation apparatus may be integrated into the inverter unit connected to the output side of the DC/DC conversion unit. In this case, the auxiliary source may bidirectionally obtain power from an input side of the inverter unit or the power grid on the output side of the inverter unit, to ensure working stability of the fault isolation apparatus.

According to another aspect, a direct current boost apparatus is provided. The direct current boost apparatus includes a DC/DC conversion unit in a power supply system and the fault isolation apparatus in any one of the foregoing aspects. A circuit breaker in the fault isolation apparatus is located on a bus connected to an input terminal of the DC/DC conversion unit.

In this application, the foregoing fault isolation apparatus described in any one of the foregoing implementations may be integrated into the DC/DC conversion unit, so that fault isolation is implemented on the DC/DC conversion unit.

According to another aspect, an inverter apparatus is provided, where the inverter apparatus includes an inverter unit and the fault isolation apparatus in any one of the foregoing aspects. An input terminal of the inverter unit is configured to be connected to one or more DC/DC conversion units in a power supply system. A circuit breaker in the fault isolation apparatus is located on a bus connected to an output terminal of any DC/DC conversion unit.

In this application, the foregoing fault isolation apparatus described in any one of the foregoing implementations may be further integrated into the inverter unit, so that fault isolation can also be implemented on the DC/DC conversion unit.

BRIEF DESCRIPTION OF DRAWINGS

FIG. 4A and FIG. 4B are a schematic diagram of a structure of another split string inverter according to an embodiment of this application;

DESCRIPTION OF EMBODIMENTS

To make objectives, technical solutions, and advantages of this application clearer, the following further describes implementations of this application in detail with reference to the accompanying drawings.

Before a fault isolation apparatus provided in the embodiments of this application is described, an application scenario in the embodiments of this application is first described.

Figure 2A:
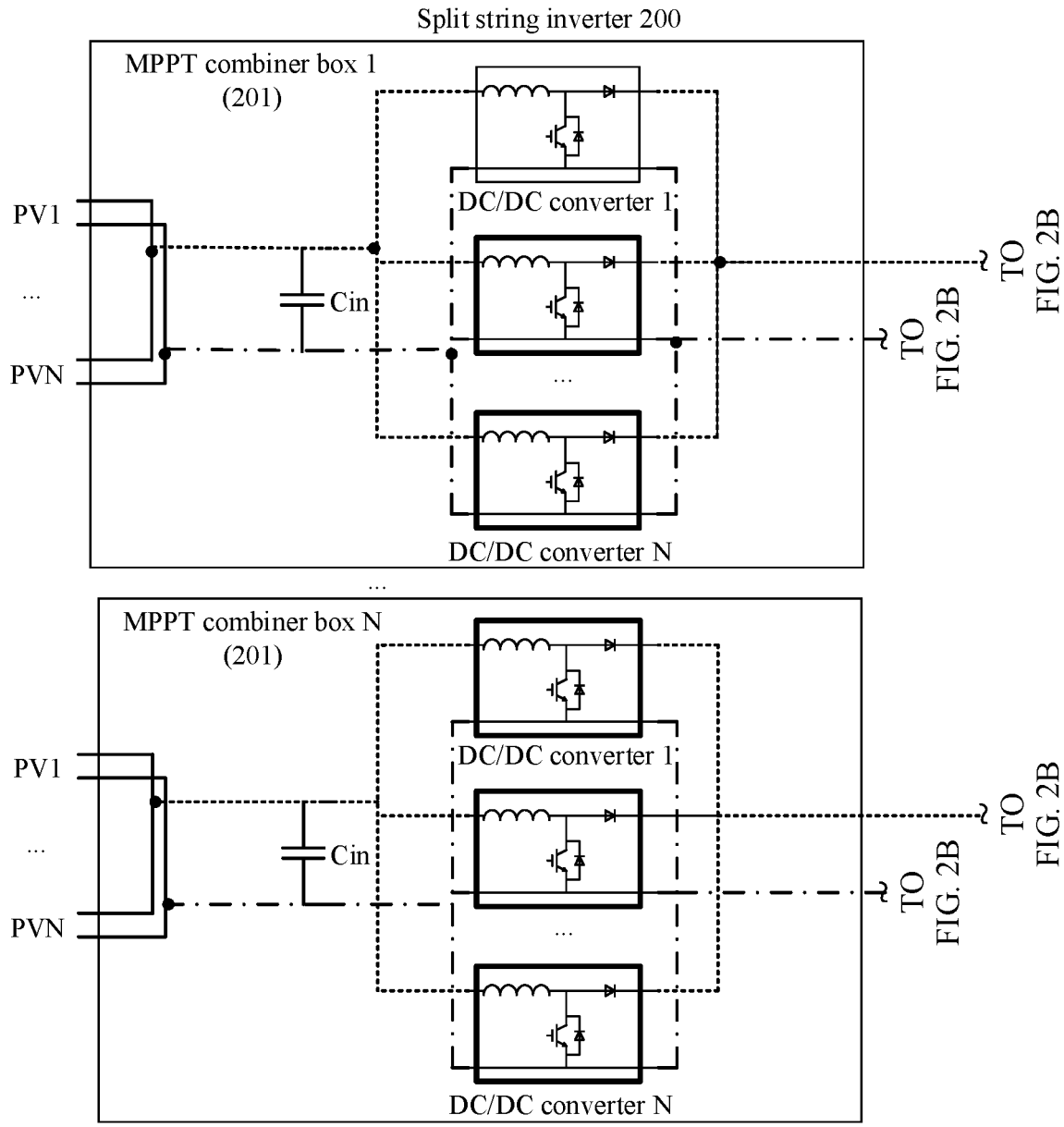
FIG. 2A and FIG. 2B are a schematic diagram of a structure of a split string inverter according to an embodiment of this application.
Figure 2B:
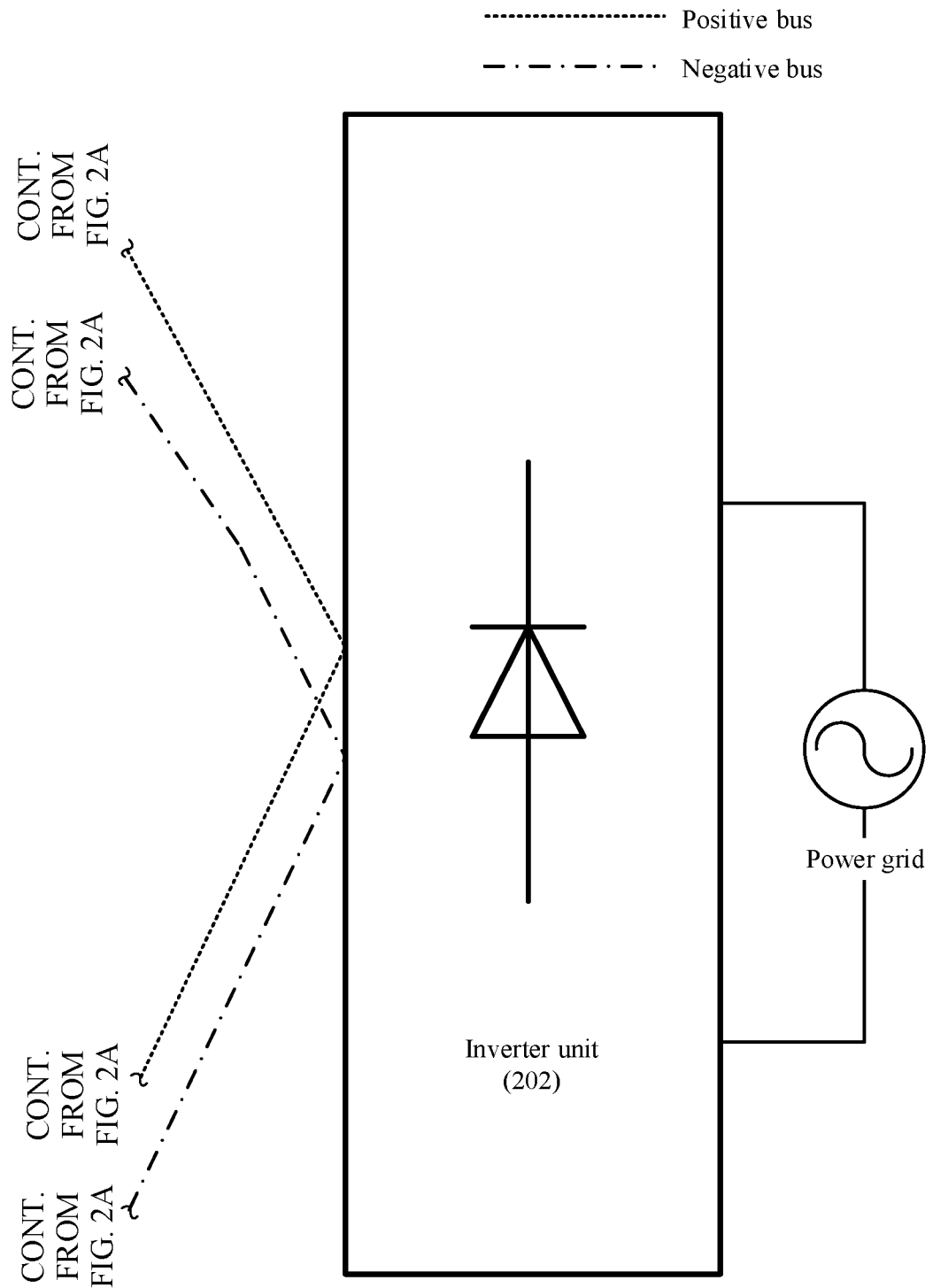

With development of photovoltaic technologies, split string inverters are increasingly applied to a power supply system based on the photovoltaic technology. The split string inverter is a system including two machines obtained by separately designing a direct current boost apparatus responsible for boosting and an inverter unit responsible for inversion. FIG. 2A and FIG. 2B are a schematic diagram of a structure of a split string inverter according to an embodiment of this application. As shown in FIG. 2A and FIG. 2B, a split string inverter 200 includes one or more maximum power point tracking (MPPT) combiner boxes 201 and an inverter unit 202. Each MPPT combiner box 201 is configured to be connected to one photovoltaic battery panel. The photovoltaic battery panel includes one or more battery panels. Each battery panel may be a battery panel including photovoltaic batteries. In FIG. 2A, a plurality of battery panels are marked as PV1 to PVN, and N is a positive integer greater than or equal to 1. One or more battery panels in each photovoltaic battery panel are connected in parallel. Each MPPT combiner box 201 includes one or more DC/DC converters that are marked as a DC/DC converter 1 to a DC/DC converter N in FIG. 2A, and the one or more DC/DC converters in each MPPT combiner box 201 are connected in parallel. The plurality of MPPT combiner boxes 201 are connected in parallel and then connected to the inverter unit. The inverter unit in FIG. 2B includes one or more direct current/alternating current (DC/AC) inverters, and the one or more inverters are connected in parallel. For ease of description, a positive bus and a negative bus in FIG. 2A and FIG. 2B are distinguished from each other by using different line types.

As shown in FIG. 2A, that a plurality of DC/DC converters in each MPPT combiner box 201 are connected in parallel means that positive bus input terminals of the DC/DC converters are connected in parallel, negative bus input terminals of the DC/DC converters are connected in parallel, positive bus output terminals of the DC/DC converters are connected in parallel, and negative bus output terminals of the DC/DC converters are connected in parallel.

In addition, as shown in FIG. 2A, an input capacitor Cin is connected between an input positive bus and an input negative bus of each MPPT combiner box 201. The input capacitor Cin is configured to filter electric energy that is input to the plurality of DC/DC converters. The input positive bus is a bus connected to the positive bus input terminal of each DC/DC converter, and the input negative bus is a bus connected to the negative bus input terminal of each DC/DC converter.

The fault isolation apparatus, a direct current boost apparatus, and an inverter apparatus in the embodiments of this application may be applied to the split string inverter shown in FIG. 2A and FIG. 2B.

Figure 3A:
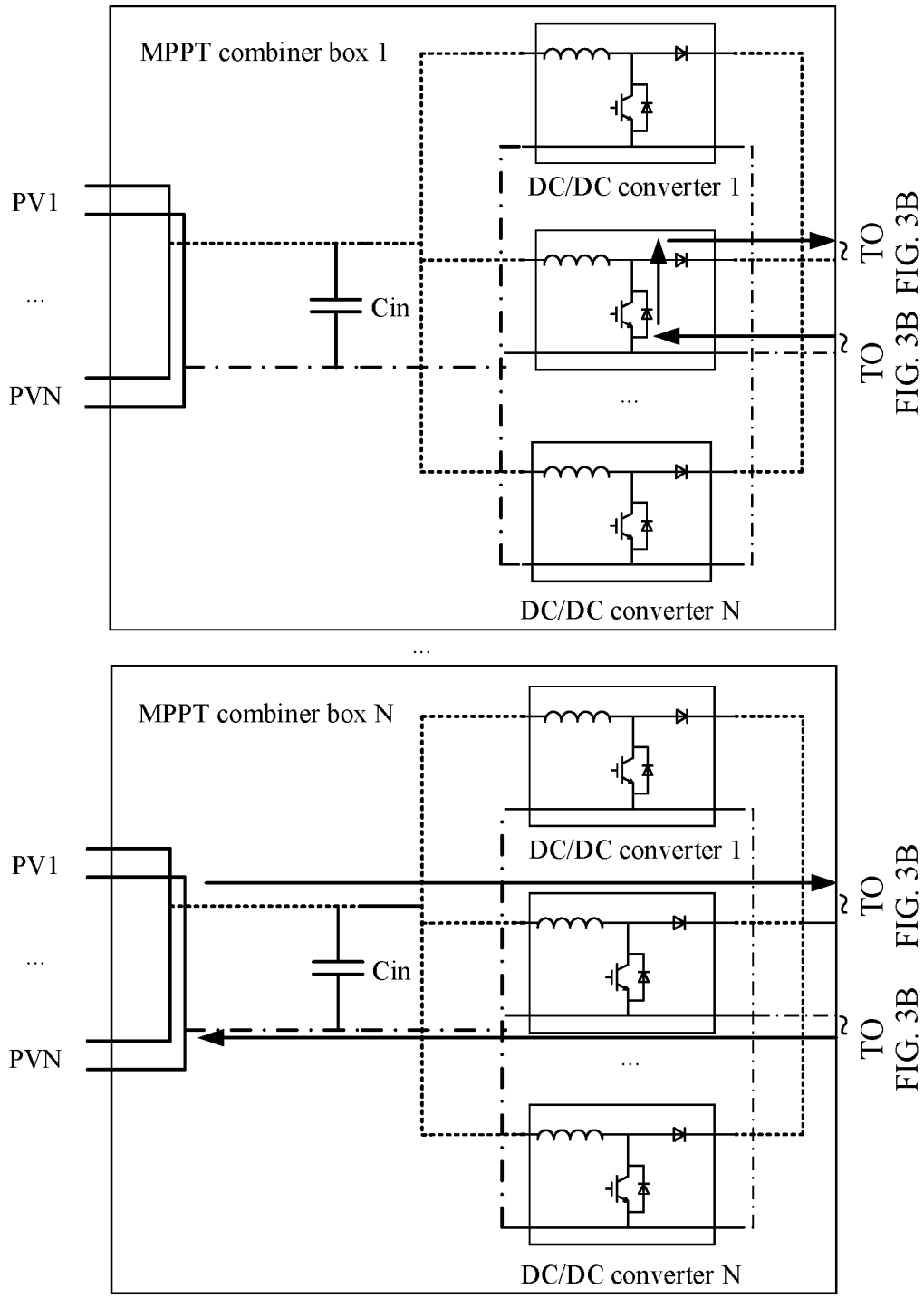
FIG. 3A and FIG. 3B are a schematic diagram of an output reverse connection fault according to an embodiment of this application.
Figure 3B:
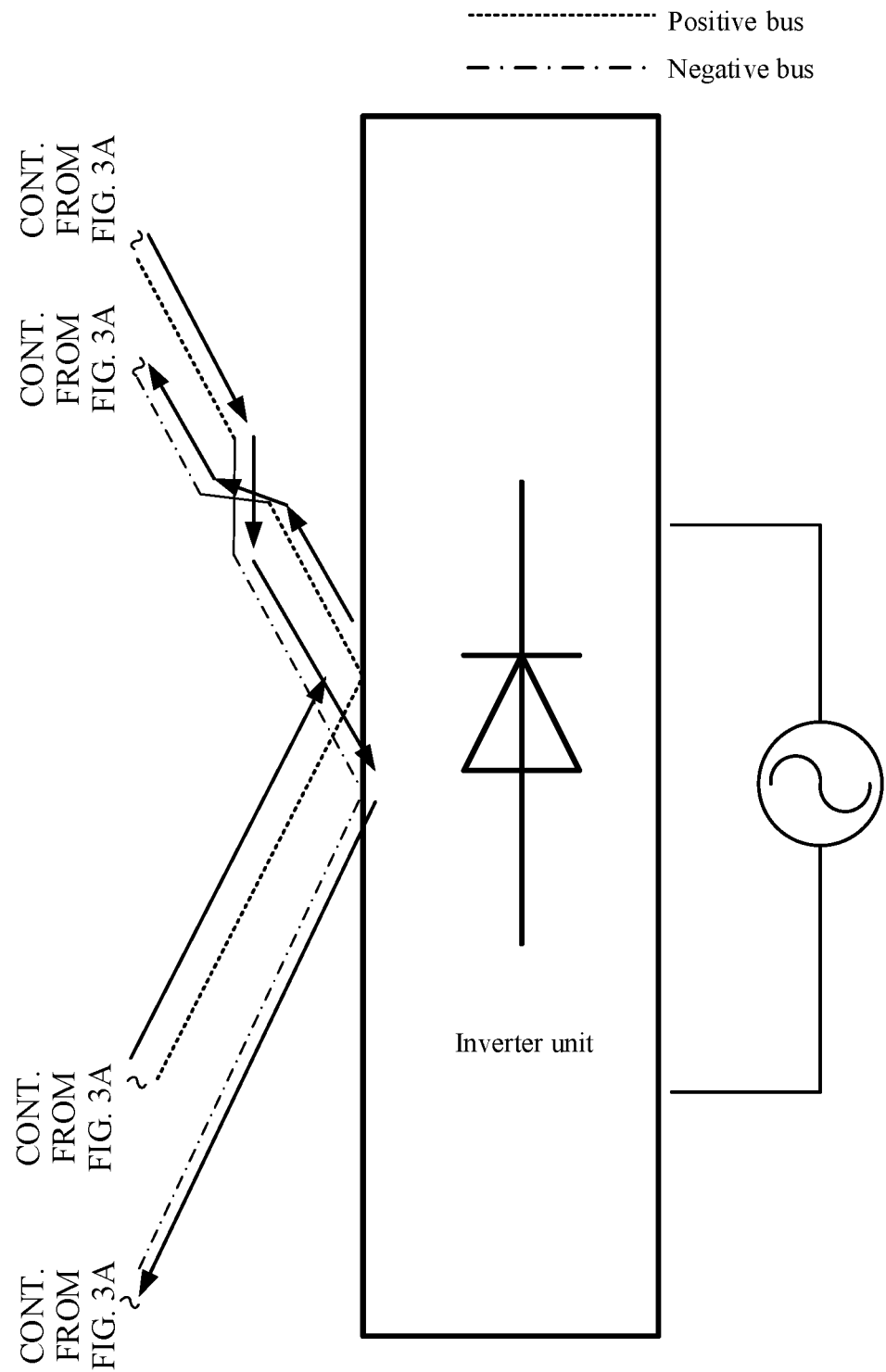

For the split string inverter shown in FIG. 2A and FIG. 2B, if an output bus of an MPPT combiner box 1 is reversely connected, it is equivalent to that the MPPT combiner box 1 is connected in series to other parallel MPPT combiner boxes 201. Therefore, energy on an output bus of another MPPT combiner box 201 is backfed to the output bus of the MPPT combiner box 1, and a flow direction of the backfed energy is shown by a line with an arrow in FIG. 3A and FIG. 3B. In this case, for any DC/DC converter in the MPPT combiner box 1, for example, for the second DC/DC converter in the MPPT combiner box 1 in FIG. 3A, energy backfed to the DC/DC converter is input from a negative output bus terminal, and then is output from a positive output bus after passing through two diodes in the figure. Consequently, the DC/DC converter is short-circuited. When the DC/DC converter is short-circuited, the diodes connected in series in the DC/DC converter are turned on, and carry all short circuit currents of the other parallel MPPT combiner boxes. As a result, a diode that is in the DC/DC converter and that is connected in parallel with a power switch is damaged due to overcurrent. If isolation cannot be effectively performed, the short circuit currents of the other parallel MPPT combiner boxes may continue to be backfed to a battery panel connected to an input terminal of the MPPT1 combiner box. Consequently, the battery panel is damaged, and serious damage is caused to personal safety and property of a customer.

Figure 1A:
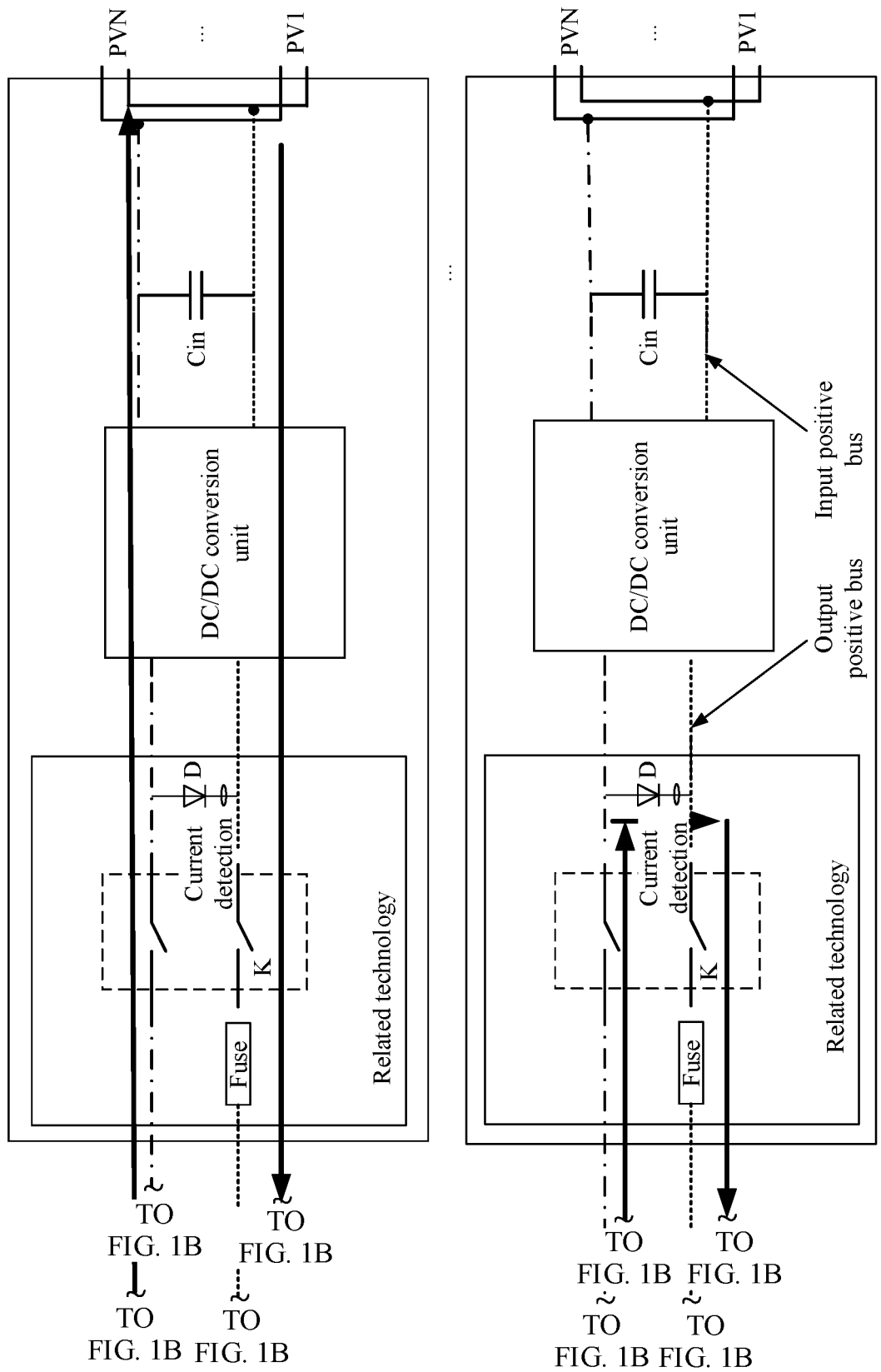
FIG. 1A and FIG. 1B are a schematic diagram of a fault isolation manner according to a related technology.
Figure 1B:
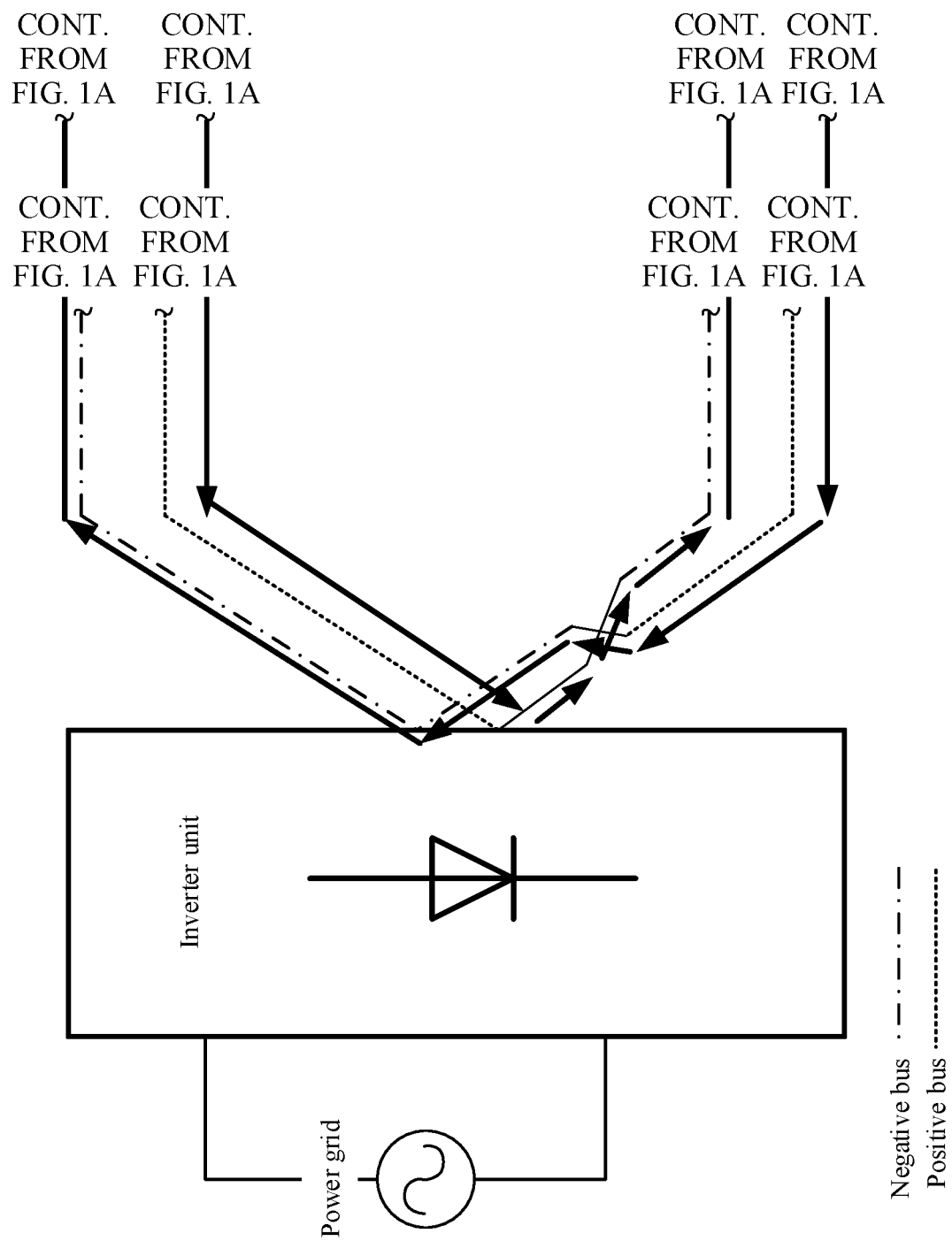
Figure 4A:
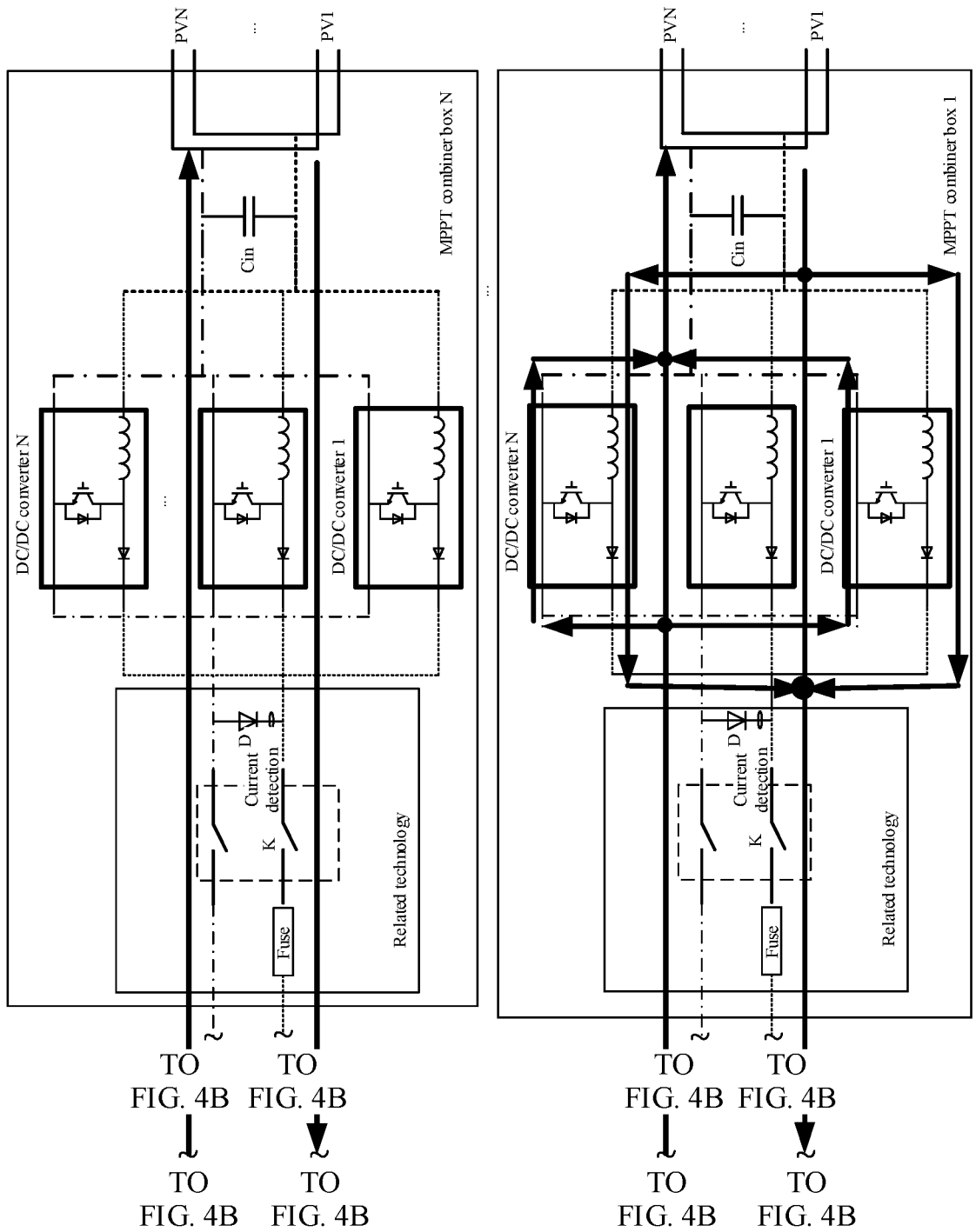

In addition, when a related technology shown in FIG. 1A and FIG. 1B is applied to the split string inverter shown in FIG. 2A and FIG. 2B, another split string inverter shown in FIG. 4A and FIG. 4B may be obtained. As shown in FIG. 4A, after a plurality of DC/DC converters in each MPPT combiner box 201 are connected in parallel, a reverse diode D is deployed between an output positive bus and an output negative bus, a circuit breaker K is further deployed on the output positive bus, and the circuit breaker K is further connected in series to a fuse. For any MPPT combiner box 201, as shown in FIG. 4A and FIG. 4B, when the MPPT combiner box 201 works normally, a current path is shown by a line segment with an arrow in FIG. 4A and FIG. 4B. A current does not pass through the diode D between the positive bus and the negative bus, a current on the diode D is zero, and no alarm is generated. A current on the fuse is a current obtained after the plurality of DC/DC converters in the MPPT combiner box are connected in parallel, and the fuse is not blown.

Figure 5A:
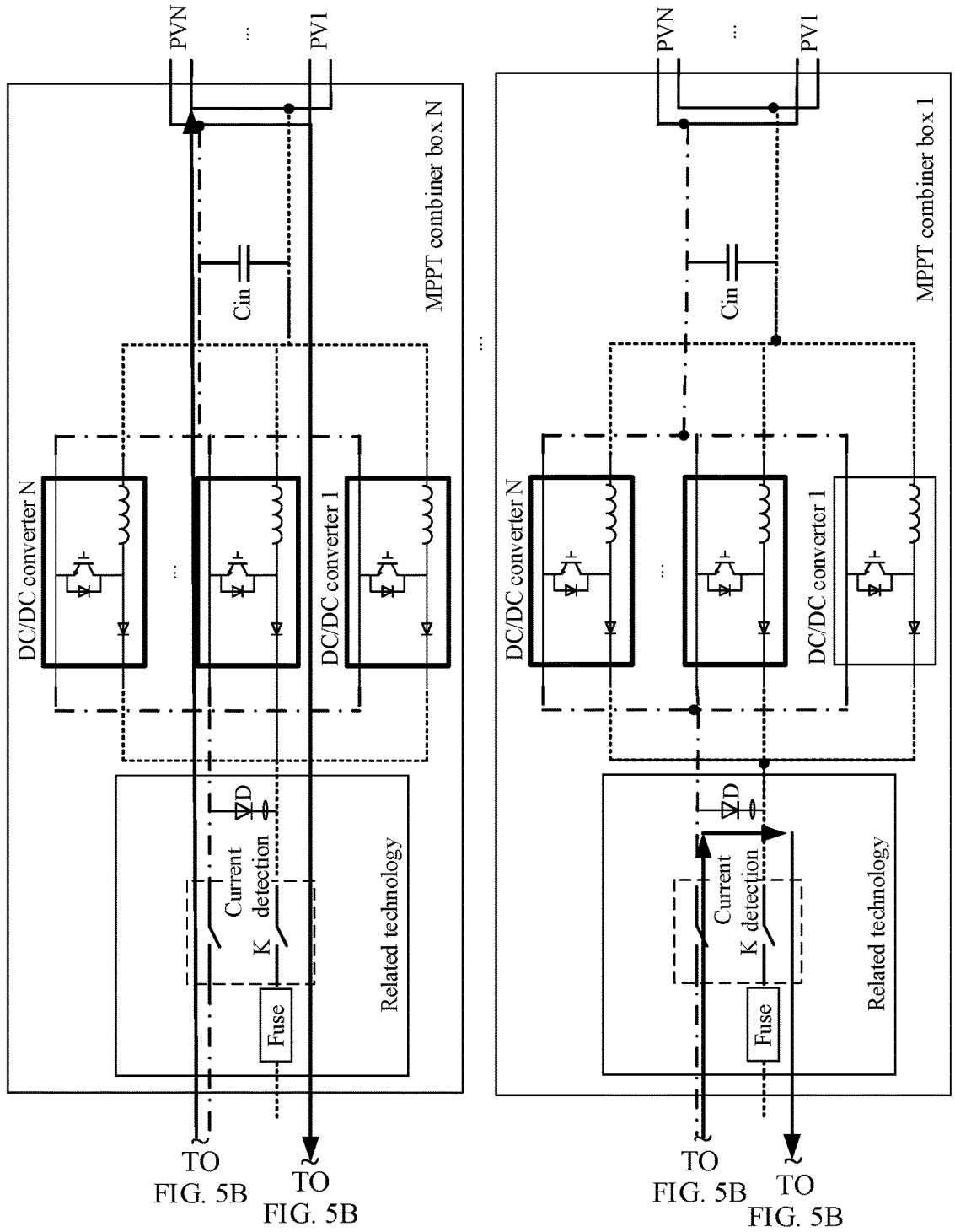
FIG. 5A and FIG. 5B are a schematic diagram of another output reverse connection fault according to an embodiment of this application.
Figure 5B:
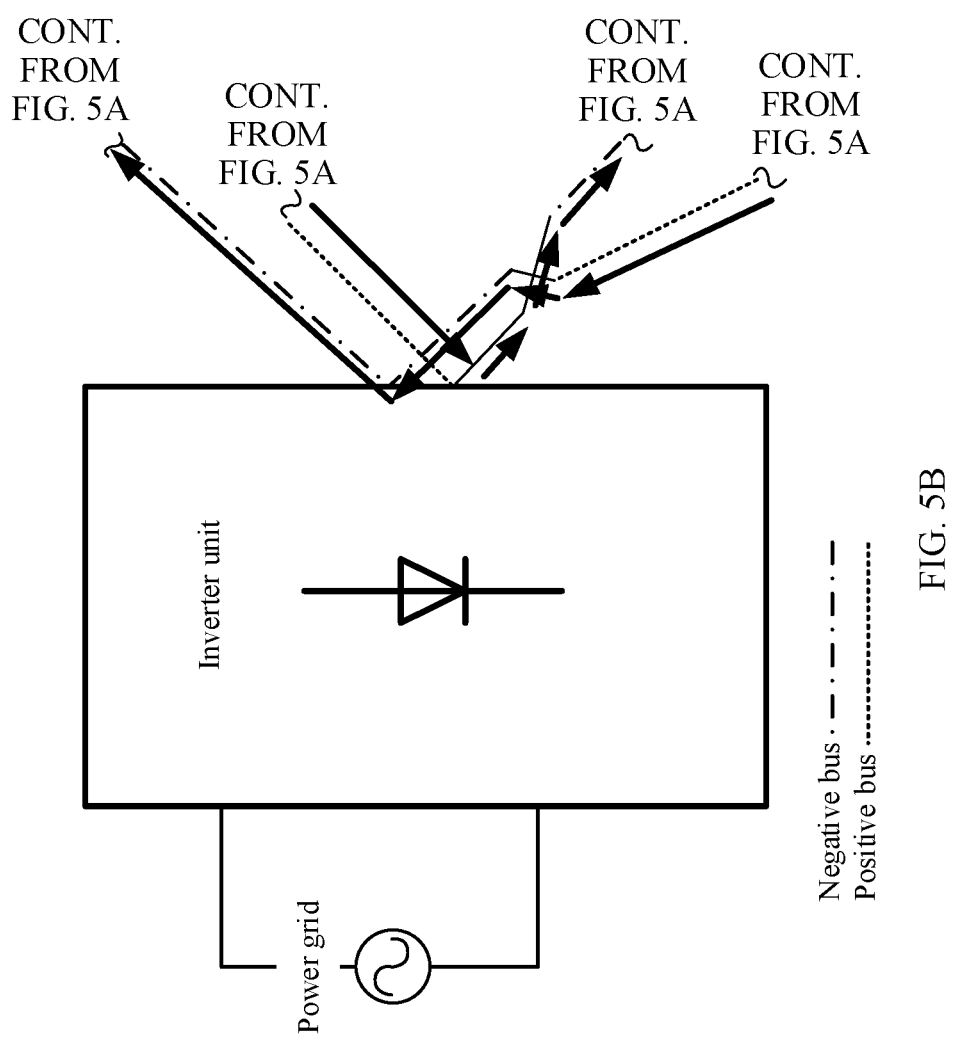

The MPPT combiner box is used as an example for description. When output of an MPPT combiner box 1 is reversely connected, that is, when the output positive bus of the MPPT combiner box 1 is connected to a negative bus input terminal of an inverter unit, and the output negative bus is connected to a positive bus input terminal of the inverter unit, the diode D is in a turn-on state, a short-circuit fault occurs in the MPPT combiner box 1, and energy of another MPPT combiner box is backfed to the MPPT combiner box 1. A line with an arrow in FIG. 5A and FIG. 5B is used to indicate a flow direction of the backfed energy. In this case, a current on the positive bus of the MPPT combiner box 1 increases sharply. As shown in FIG. 5A and FIG. 5B, the diode D and the fuse in the MPPT combiner box 1 carry currents of the another MPPT combiner box. Therefore, when it is detected that there is a current on the diode D, the current path may be cut off by actively opening the circuit breaker K or by blowing the fuse, to perform fault isolation on the MPPT combiner box 1, so as to protect the another MPPT combiner box.

Figure 6A:
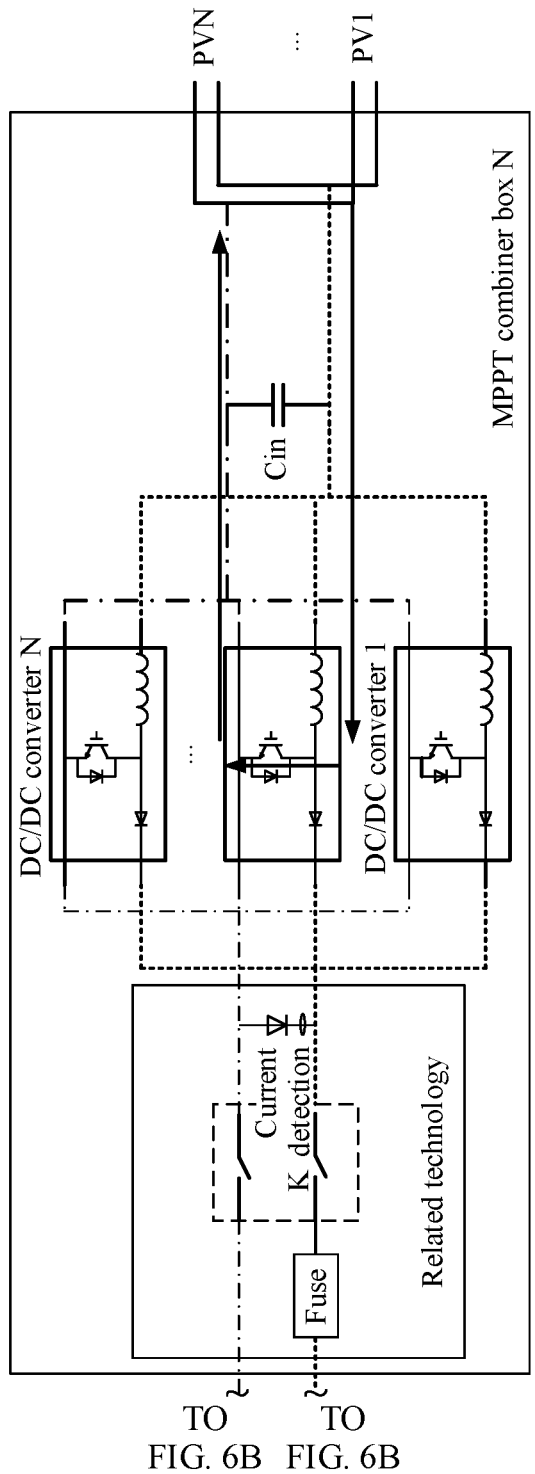
FIG. 6A and FIG. 6B are a schematic diagram of a short-circuit fault of a DC/DC converter according to an embodiment of this application.
Figure 6A:
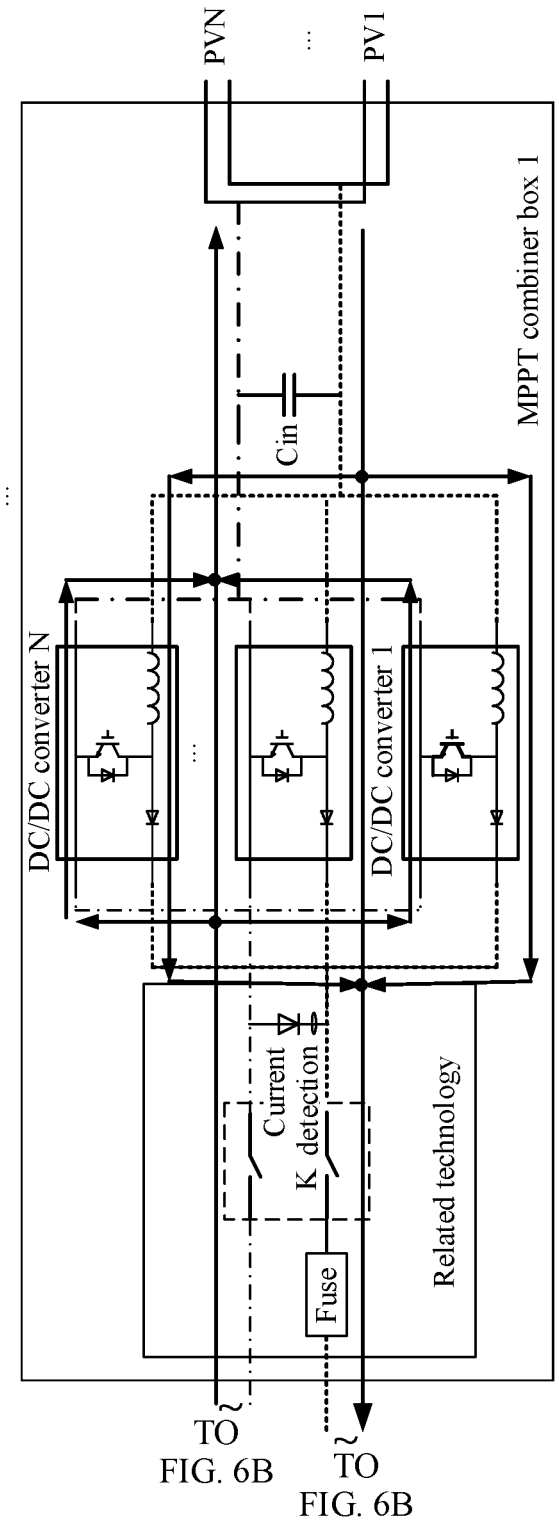
Figure 6B:
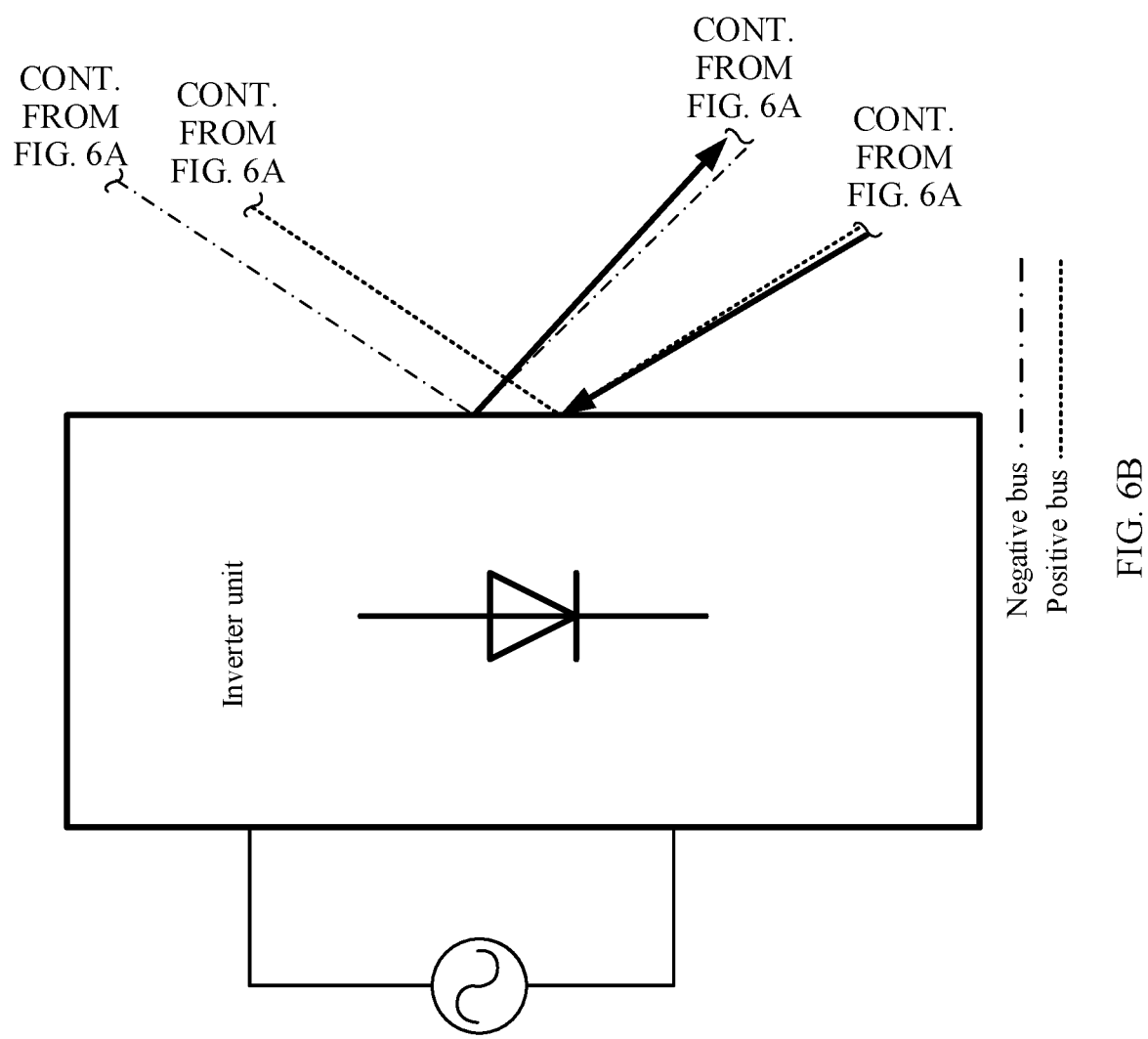

In the split string inverter shown in FIG. 4A and FIG. 4B, for any MPPT combiner box, for example, an MPPT combiner box N, if a short-circuit fault occurs in a DC/DC converter in the MPPT combiner box N, for example, a short-circuit fault occurs in the second DC/DC converter, a current of another DC/DC converter in the MPPT combiner box N is all concentrated on the DC/DC converter. This also causes fault spread. As shown by the current in the MPPT combiner box N in FIG. 6A, there is no current on the diode and the fuse. In other words, when a short-circuit fault occurs in a DC/DC converter in the MPPT combiner box, a fault isolation manner in the related technology fails.

Figure 7A:
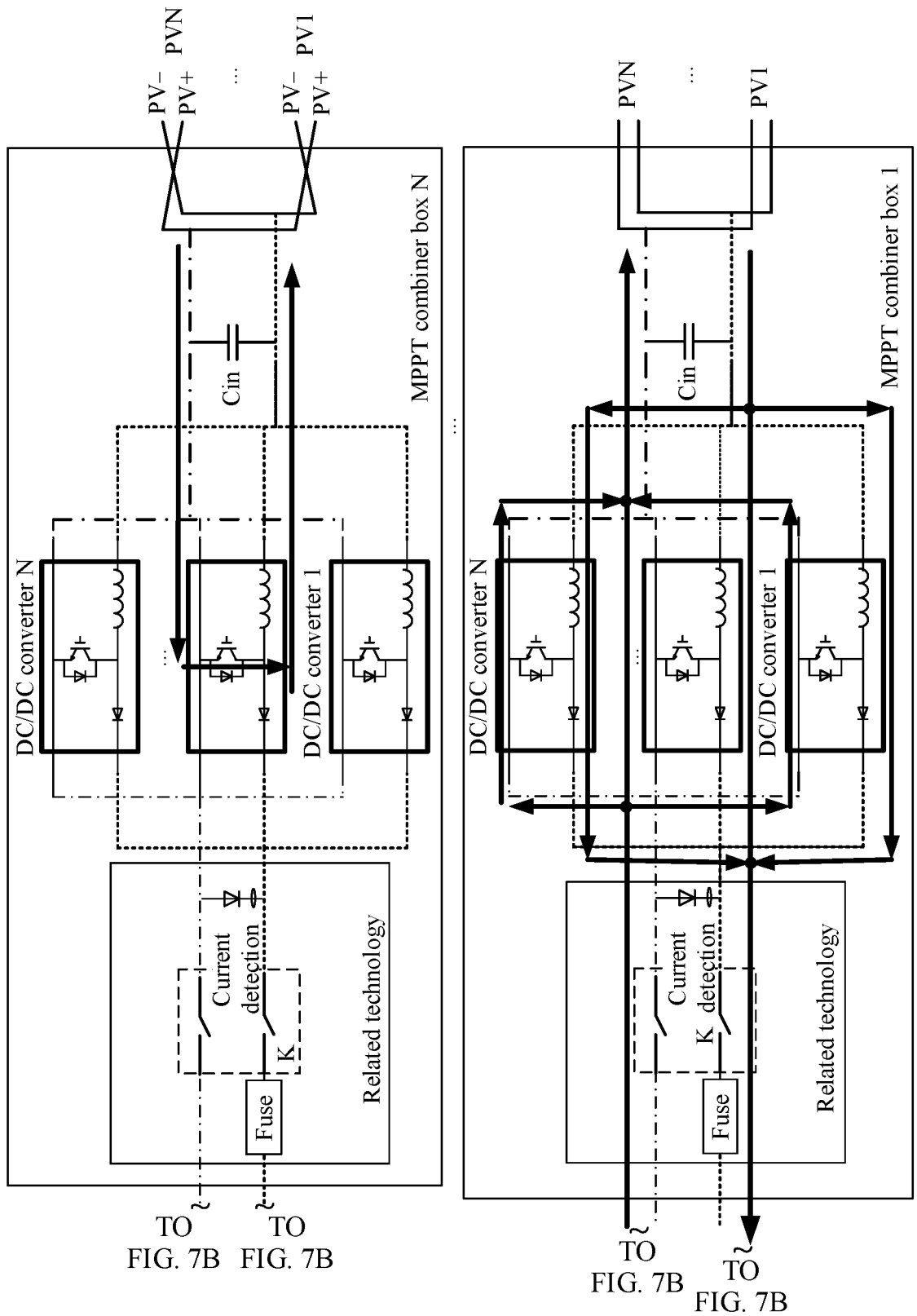
FIG. 7A and FIG. 7B are a schematic diagram of an input reverse connection fault according to an embodiment of this application.
Figure 7B:
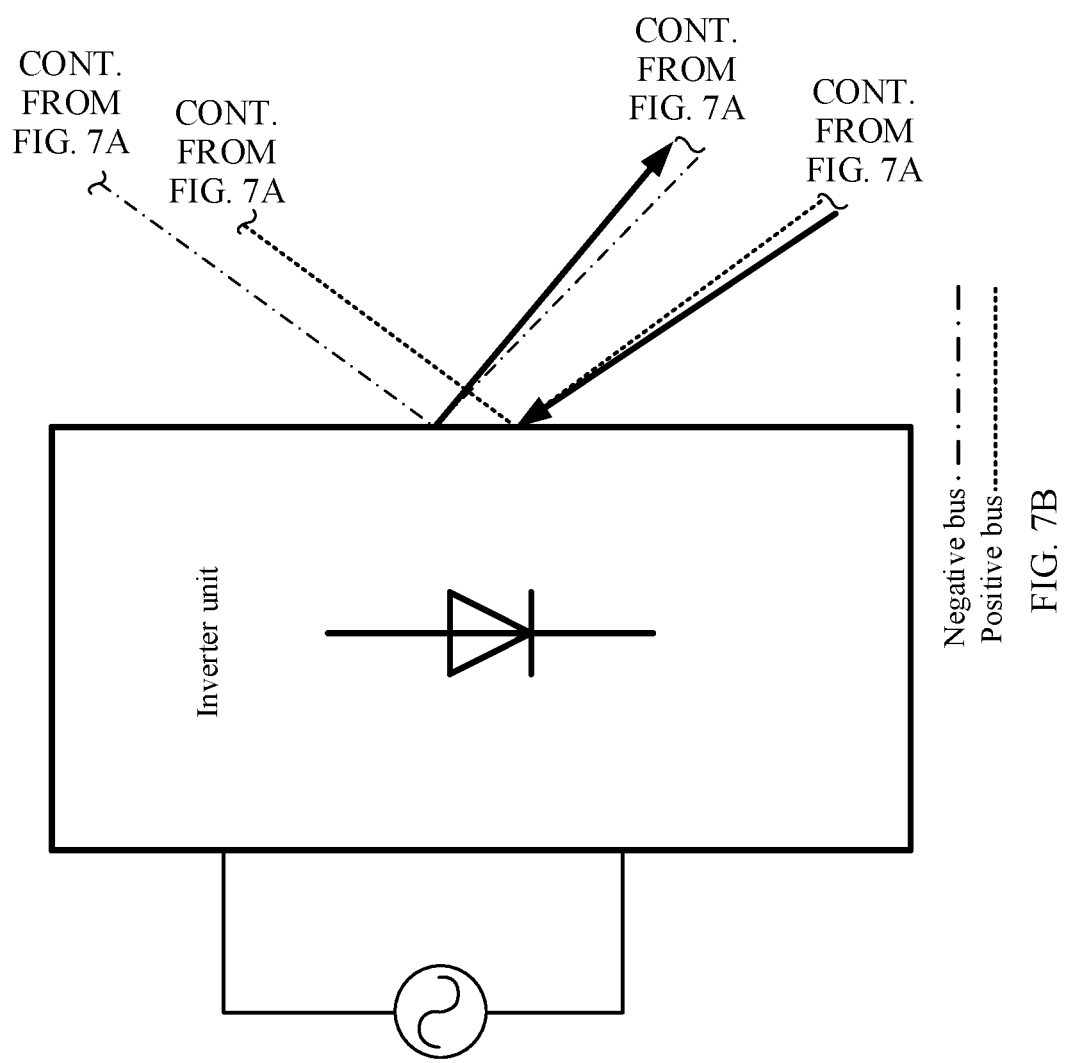

In addition, if input of the MPPT combiner box N is reversely connected, input of the photovoltaic battery panel is short-circuited by a diode that is reversely connected in parallel with an IGBT in the DC/DC converter, and a current that is input from the photovoltaic battery panel all flows through the diode that is reversely connected in parallel with the IGBT. This may further cause damage to the diode that is reversely connected in parallel with the IGBT. As shown by the current in the MPPT combiner box N in FIG. 7A, no current flows through the diode and the fuse either. In other words, when the input of the MPPT combiner box is reversely connected, the fault isolation manner in the related technology also fails.

The fault isolation apparatus provided in the embodiments of this application may resolve the foregoing problem that cannot be resolved in the fault isolation manner in the related technology. The following explains and describes the fault isolation apparatus in detail.

Figure 8:
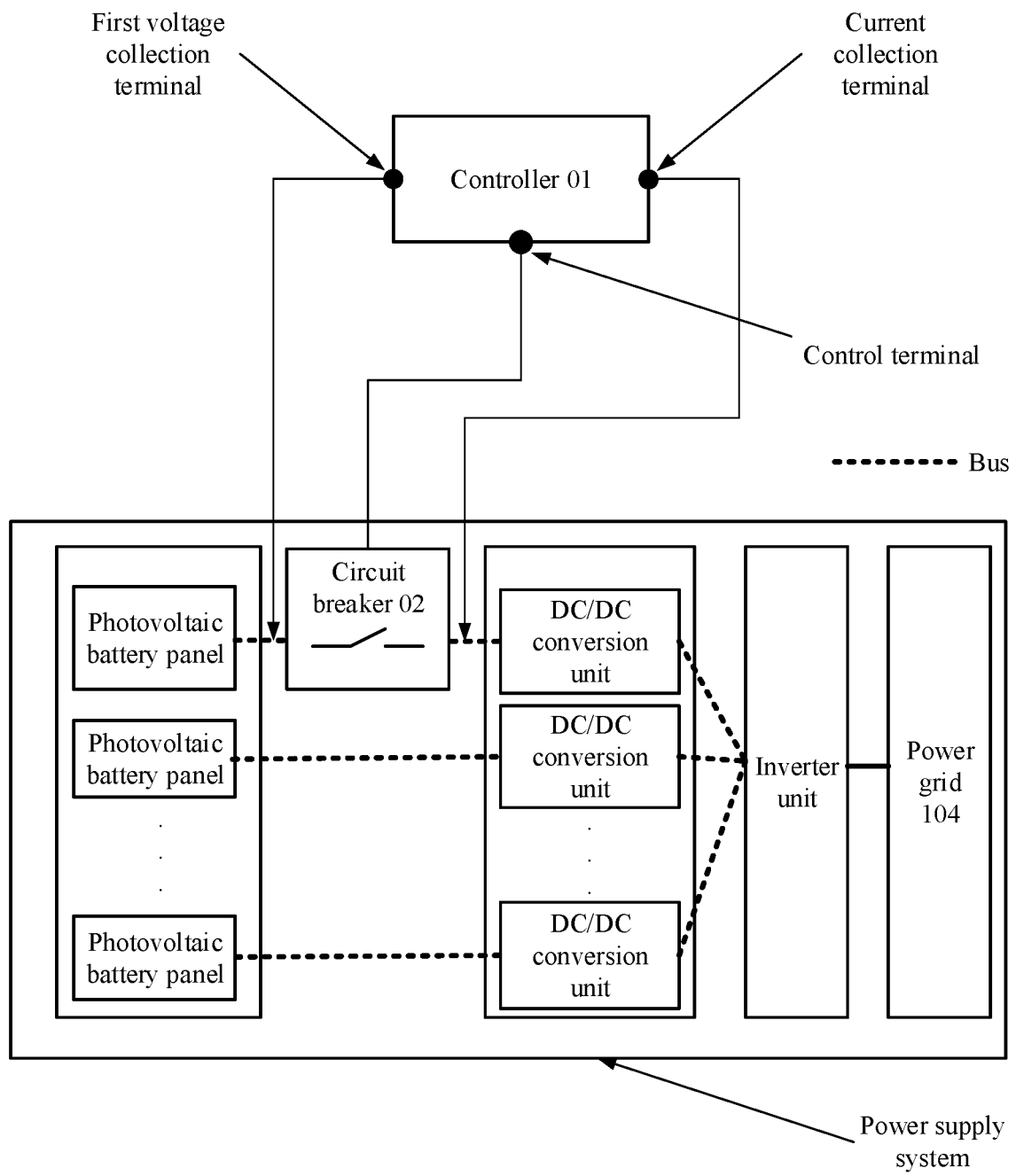
FIG. 8 is a schematic diagram of a structure of a fault isolation apparatus according to an embodiment of this application.

FIG. 8 is a schematic diagram of a structure of a fault isolation apparatus according to an embodiment of this application. As shown in FIG. 8, the fault isolation apparatus includes a controller 01 and a circuit breaker 02.

The controller 01 includes a control terminal, a first voltage collection terminal, and a current collection terminal. The control terminal of the controller 01 is connected to the circuit breaker 02.

The circuit breaker 02 is located on a bus connected to a DC/DC conversion unit in a power supply system. The circuit breaker 02 is configured to: when the circuit breaker 02 is closed, control the bus on which the circuit breaker 02 is located to be connected, or when the circuit breaker 02 is opened, control the bus on which the circuit breaker 02 is located to be disconnected. In other words, the connection and the disconnection of the bus connected to the DC/DC conversion unit are controlled by using the circuit breaker 02.

The first voltage collection terminal of the controller 01 is configured to collect a voltage on the bus on which the circuit breaker 02 is located, and the current collection terminal of the controller 01 is configured to collect a current on the bus on which the circuit breaker 02 is located.

The control terminal of the controller 01 is configured to: when it is detected that the voltage collected by the first voltage collection terminal is a negative value, or when it is detected that the voltage collected by the first voltage collection terminal is lower than a voltage threshold and the current collected by the current collection terminal is higher than a current threshold, control the circuit breaker 02 to be in an off state.

In FIG. 8, an example in which the circuit breaker 02 is located on an input bus connected to an input terminal of the DC/DC conversion unit is used for description. Alternatively, the circuit breaker 02 may be located on an output bus connected to an output terminal of the DC/DC conversion unit. This is not specifically limited in this embodiment of this application.

In addition, in FIG. 8, an example in which the circuit breaker 02 is located on a bus connected to the first DC/DC conversion unit is used for description. The fault isolation apparatus provided in this embodiment of this application may be deployed on a bus connected to another DC/DC conversion unit in FIG. 8, and examples are not shown one by one in FIG. 8.

The fault isolation apparatus shown in FIG. 8 has at least the following technical effects:

The circuit breaker 02 is located on the bus connected to the DC/DC conversion unit in the power supply system. Therefore, when the circuit breaker 02 is located on a bus connected to a DC/DC conversion unit, if the voltage collected by the first voltage collection terminal is a negative value, it indicates that input or output of the DC/DC conversion unit is reversely connected. In this case, if the circuit breaker is controlled to be opened, the DC/DC conversion unit can be prevented from being connected in series to other parallel DC/DC conversion units, so that the another DC/DC conversion unit can be effectively prevented from backfeeding energy to the DC/DC conversion unit. In other words, the fault isolation apparatus provided in this embodiment of this application can effectively perform fault isolation on an input reverse connection or an output reverse connection.

If the voltage collected by the first voltage collection terminal is low and the current collected by the current collection terminal is large, it indicates that the DC/DC conversion unit is short-circuited. In this case, if the circuit breaker is controlled to be opened, another component connected in series to the DC/DC conversion unit can be prevented from backfeeding energy to the DC/DC conversion unit. In other words, the fault isolation apparatus provided in this embodiment of this application can effectively perform fault isolation on a short-circuit fault of the DC/DC conversion unit.

In other words, in this application, the fault isolation apparatus is applicable to a short-circuit fault caused because input is reversely connected or output is reversely connected, and is also applicable to a short-circuit fault caused because the DC/DC conversion unit is short-circuited, to improve application flexibility of the fault isolation apparatus.

In addition, when fault isolation needs to be performed on a DC/DC conversion unit, the controller may be used to implement fault isolation for the DC/DC conversion unit only by deploying a circuit breaker on a bus connected to the DC/DC conversion unit in an original power supply system. However, in a related technology, to implement fault isolation, both a circuit breaker and a diode or both a diode and a fuse need to be deployed. It is clearly that, according to the fault isolation apparatus provided in this application, no additional diode needs to be deployed in the power supply system, and no fuse needs to be used, so that costs of reconstructing the original power supply system are reduced.

In addition, an appropriate model needs to be selected in advance for the diode used in the related technology. If the selected model is not appropriate, the diode is easily damaged when output is reversely connected. When the diode is damaged, fault isolation cannot be performed by using the diode in the related technology. However, in this application, a fault does not need to be detected by using the diode. Instead, a fault is directly detected based on a voltage or a current that is collected by the controller. Fault isolation can be implemented provided that a voltage and a current can be detected. Therefore, reliability of the fault isolation apparatus provided in this application is also high.

Figure 9:
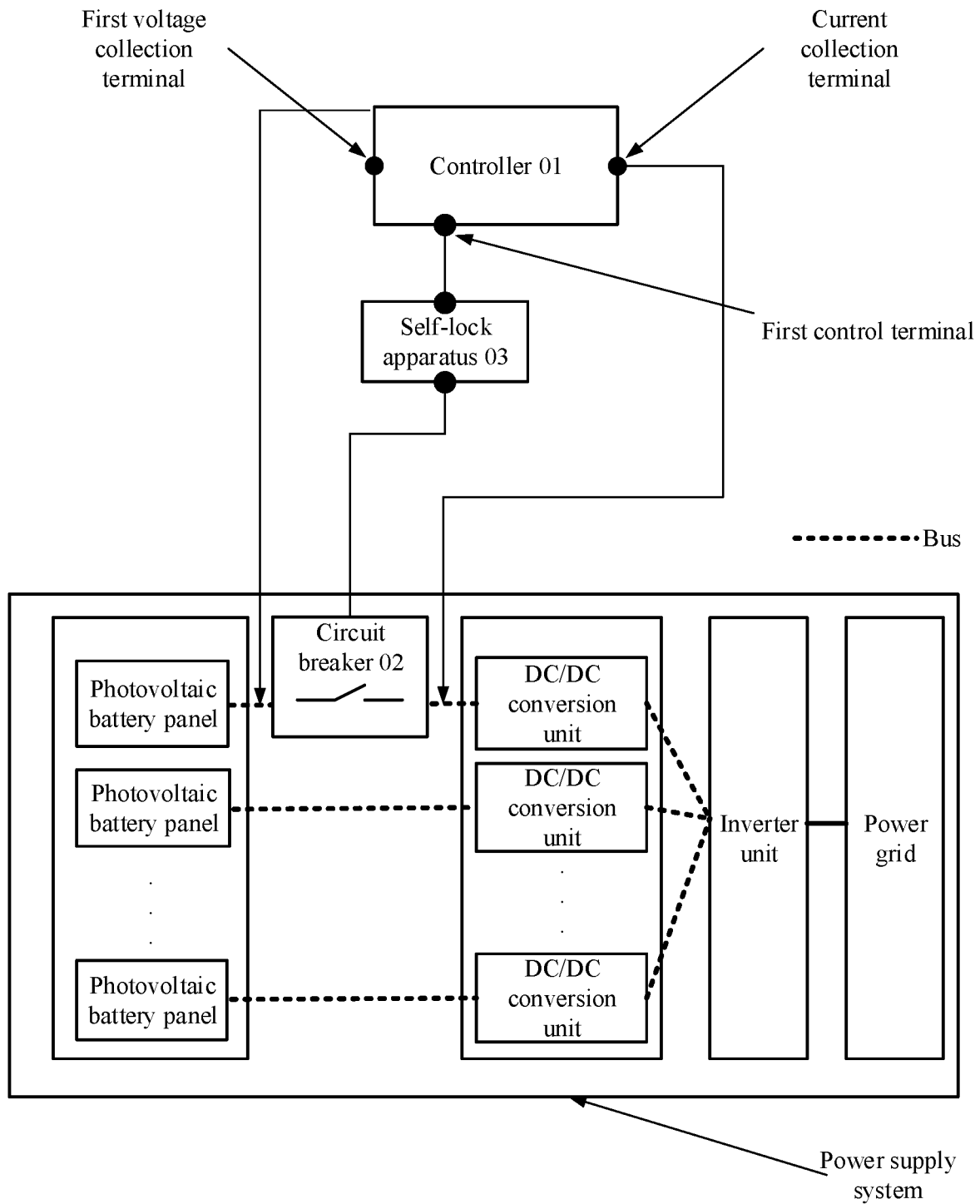
FIG. 9 is a schematic diagram of a structure of another fault isolation apparatus according to an embodiment of this application.

When input or output of the DC/DC conversion unit is reversely connected, even if the circuit breaker 02 is not closed, a voltage on the bus of the DC/DC conversion unit is negative. Therefore, in this embodiment of this application, as shown in FIG. 9, the fault isolation apparatus shown in FIG. 8 further includes a self-lock apparatus 03 of the circuit breaker 02. The self-lock apparatus 03 includes an input terminal and an output terminal. The control terminal of the controller 01 includes a first control terminal. As shown in FIG. 9, the input terminal of the self-lock apparatus 03 is connected to the first control terminal of the controller 01, and the output terminal of the self-lock apparatus 03 is connected to the circuit breaker 02. The first control terminal of the controller 01 is configured to: when the circuit breaker is in the off state, if it is detected that the voltage collected by the first voltage collection terminal is a negative value, deliver a first instruction to the input terminal of the self-lock apparatus 03, to instruct the self-lock apparatus 03 to control the off state of the circuit breaker 02 to be locked.

For the fault isolation apparatus shown in FIG. 9, the circuit breaker 02 may not be first closed after components of the power supply system are connected and before each DC/DC conversion unit is powered on. Instead, the voltage collected by the first voltage collection terminal is directly detected. If the voltage collected by the first voltage collection terminal is a negative value, it indicates that input or output of the DC/DC conversion unit is reversely connected currently. In this case, the off state of the circuit breaker 02 is controlled to be locked. In this way, even if the circuit breaker 02 subsequently receives a close instruction due to a power-on operation of the power supply system, the circuit breaker 02 cannot be switched from the off state to a close state, so that fault spread caused by closing a switch in case of a fault is avoided.

The off state of the circuit breaker 02 may be locked, that is, a circuit breaker with a self-lock function is used as the circuit breaker 02 in this application. In this way, a reverse connection fault can be detected before the circuit breaker apparatus is closed, and this is different from detecting an output reverse connection fault only after the circuit breaker is closed in the related technology. In addition, the circuit breaker apparatus can be locked by using the self-lock apparatus, so that fault spread caused by closing the circuit breaker apparatus in case of a fault is avoided.

A working principle of the self-lock apparatus 03 is as follows: After the self-lock apparatus 03 locks a state of the circuit breaker, the circuit breaker 02 can only be kept in a current state in any case, and cannot be switched to another state. Only after the self-lock apparatus 03 releases locking of the circuit breaker, the state of the circuit breaker 02 can be switched in another trigger condition.

The self-lock apparatus 03 in FIG. 9 may be implemented by using any structure that can implement self-lock of the circuit breaker 02. A specific structure of the self-lock apparatus 03 is not specifically limited in this embodiment of this application.

Figure 10:
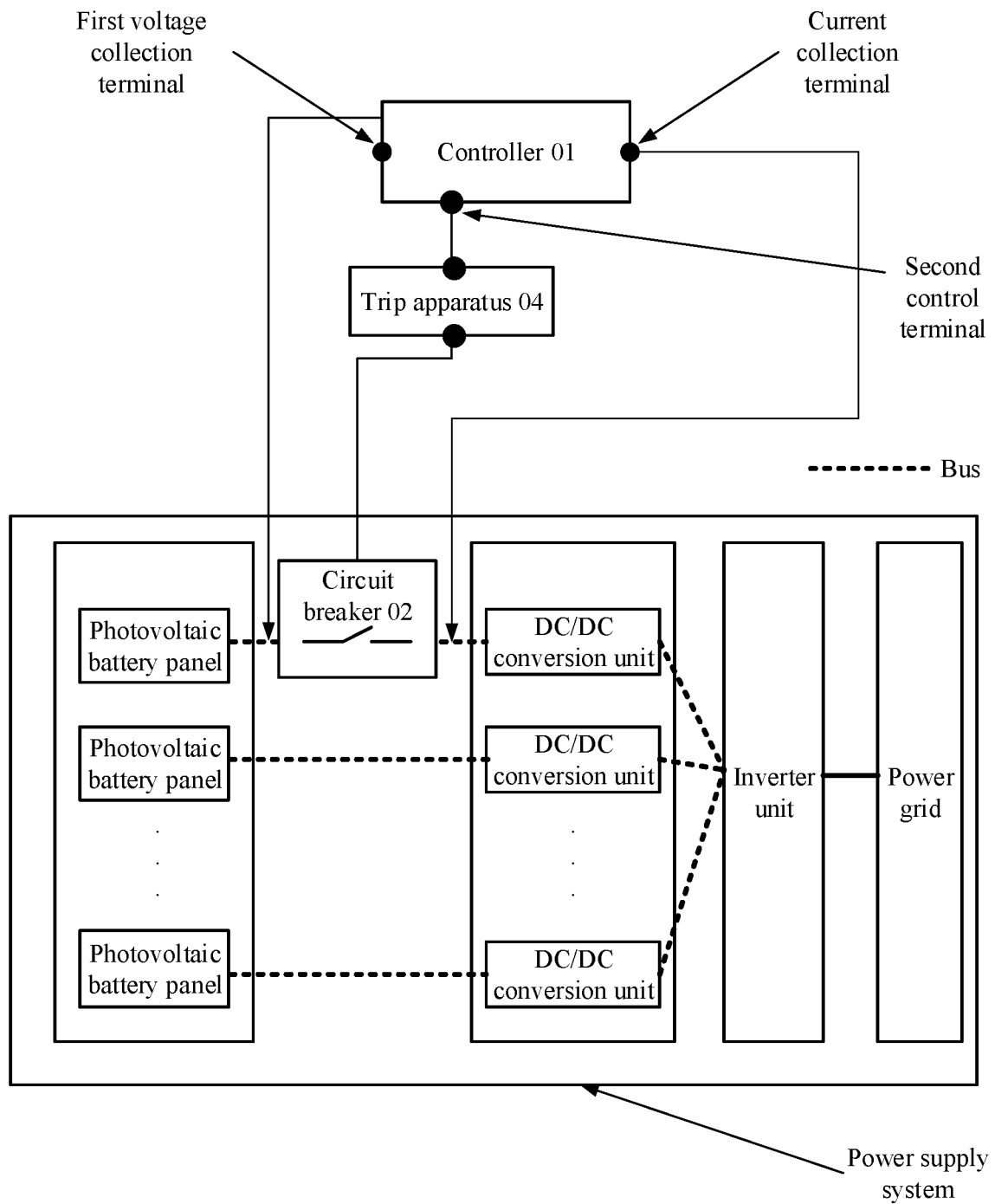
FIG. 10 is a schematic diagram of a structure of another fault isolation apparatus according to an embodiment of this application.

When a short-circuit fault occurs in a DC/DC conversion unit, a voltage and a current that are on a bus connected to the DC/DC conversion unit need to be used for comprehensive determining. Therefore, only when the circuit breaker 02 is in the close state, it can be detected that a short-circuit fault occurs in the DC/DC conversion unit. Correspondingly, as shown in FIG. 10, the fault isolation apparatus shown in FIG. 8 may further include a trip apparatus 04 of the circuit breaker 02. The trip apparatus 04 includes an input terminal and an output terminal. The control terminal of the controller 01 includes a second control terminal.

The input terminal of the trip apparatus 04 is connected to the second control terminal of the controller 01, and the output terminal of the trip apparatus 04 is connected to the circuit breaker 02.

The second control terminal of the controller 01 is configured to: when it is detected that the voltage collected by the first voltage collection terminal is lower than the voltage threshold and the collected current is higher than the current threshold, send a second instruction to the input terminal of the trip apparatus 04, to instruct the trip apparatus 04 to control the circuit breaker 02 to be switched from the close state to the off state.

For the fault isolation apparatus shown in FIG. 10, after all components of the power supply system are connected, the circuit breaker is closed. In this case, power is supplied to a power grid by using the power supply system. When it is detected that the voltage collected by the first voltage collection terminal drops to a low value and the current collected by the current collection terminal increases to a high value, it indicates that a short-circuit fault currently occurs in the DC/DC conversion unit. In this case, the circuit breaker 02 is controlled to be switched from the close state to the off state, so that energy of another DC/DC conversion unit is prevented from being backfed to the DC/DC conversion unit, to implement fault isolation when the DC/DC conversion unit is short-circuited.

The trip apparatus 04 may be an undervoltage trip apparatus. A working principle of the undervoltage trip apparatus is as follows: When a high voltage is input to the undervoltage trip apparatus, the undervoltage trip apparatus can generate sufficiently large attraction, and the attraction may enable the circuit breaker to be opened. When a small voltage is input to the undervoltage trip apparatus, attraction that can be generated by the voltage trip apparatus is not sufficiently large, and cannot attract the circuit breaker to be opened. Consequently, the circuit breaker returns to the close state. A specific structure of the undervoltage trip apparatus is not limited in this application.

In addition, the trip apparatus 04 may be another type of trip apparatus. This is not specifically limited herein either.

The self-lock apparatus 03 shown in FIG. 9 and the trip apparatus 04 shown in FIG. 10 may be both deployed in the fault isolation apparatus, and details are not described herein again.

In addition, for any DC/DC conversion unit in the power supply system, a voltage detector and a current detector are deployed on each of an input bus and an output bus of the DC/DC conversion unit, to monitor the DC/DC conversion unit in real time. Therefore, in this embodiment of this application, the first voltage collection terminal of the controller 01 may be configured to be connected to a voltage detector on the bus on which the circuit breaker 02 is located. In this case, the voltage collected by the first voltage collection terminal of the controller 01 is a voltage reported by the voltage detector on the bus on which the circuit breaker 02 is located.

In addition, the current collection terminal of the controller 01 is configured to be connected to a current detector on the bus on which the circuit breaker 02 is located. In this case, the current collected by the current collection terminal of the controller 01 is a current reported by the current detector on the bus on which the circuit breaker 02 is located.

In other words, in this embodiment of this application, a voltage and a current may be collected by using an original current detector and an original voltage detector in the power supply system, to further reduce costs of the fault isolation apparatus.

In addition, in the original power supply system, for any DC/DC conversion unit, a current detector is also deployed on each DC/DC converter in a plurality of DC/DC converters included in the DC/DC conversion unit. Therefore, the current collection terminal of the controller 01 shown in FIG. 8 may be further configured to be connected to a current detector deployed on each DC/DC converter in a plurality of DC/DC converters included in the DC/DC conversion unit. In this case, the current collected by the current collection terminal of the controller 01 is a sum of currents reported by the current detectors on all the DC/DC converters in the plurality of DC/DC converters.

With reference to the split string inverter shown in FIG. 2A and FIG. 2B, the following further explains and describes the fault isolation apparatus provided in this embodiment of this application.

Figure 11A:
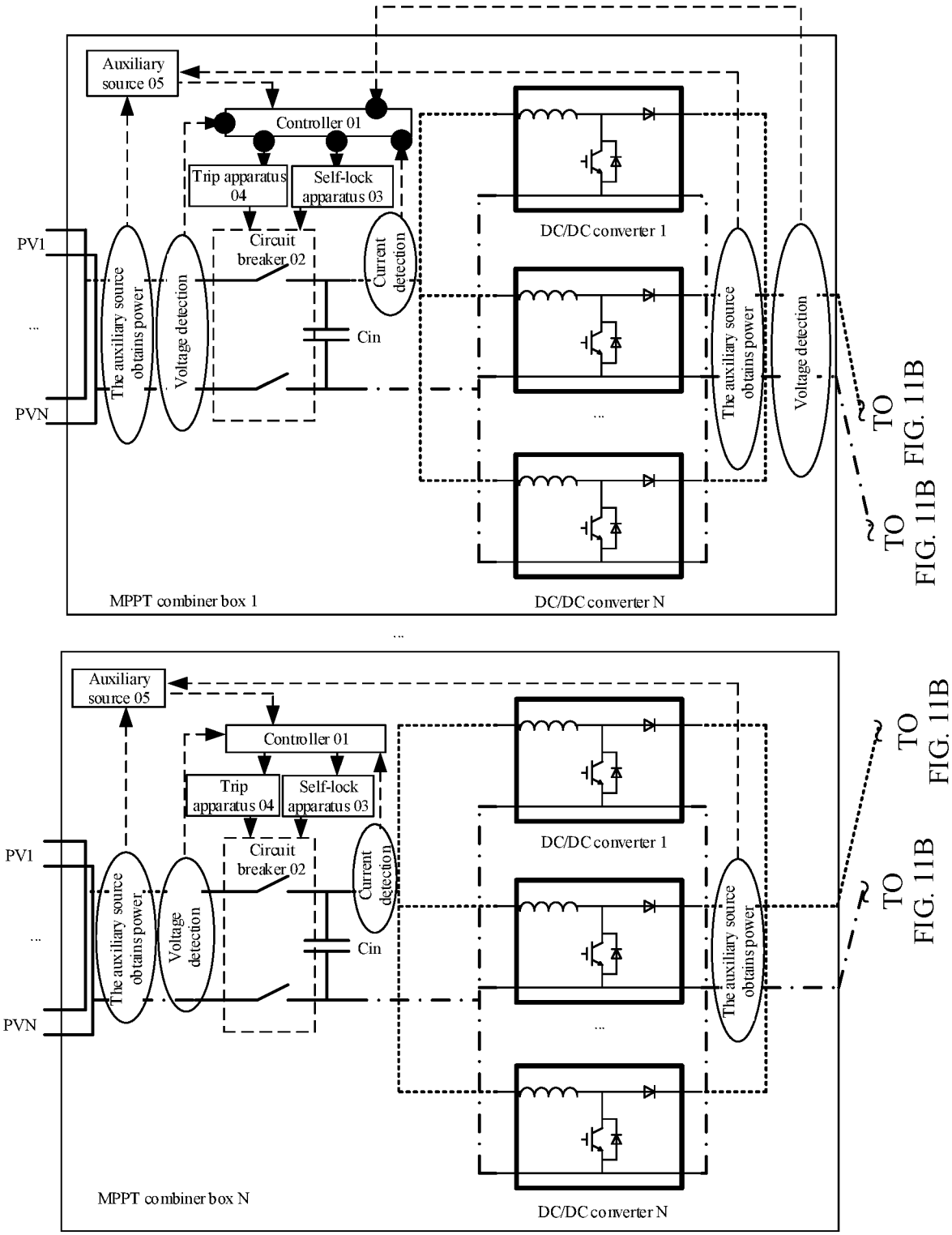
FIG. 11A and FIG. 11B are a schematic diagram of a structure of another fault isolation apparatus according to an embodiment of this application.
Figure 11B:
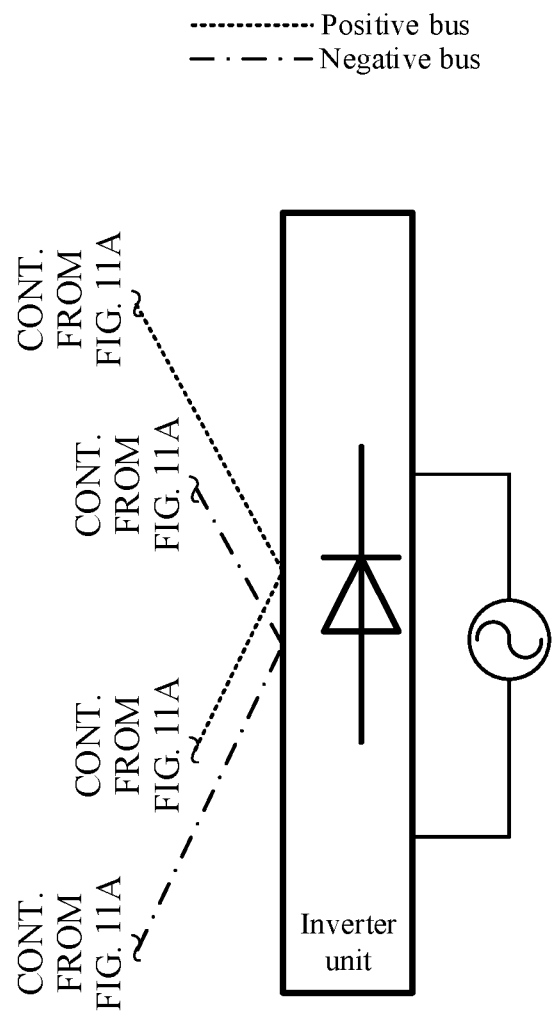

FIG. 11A and FIG. 11B are a schematic diagram of a structure of a fault isolation apparatus according to an embodiment of this application. As shown in FIG. 11A, the circuit breaker 02 is located on an input bus connected to an input terminal of any MPPT combiner box, and the input terminal of the MPPT combiner box is a terminal obtained after input terminals of all DC/DC inverters included in the MPPT combiner box are connected in parallel. Each MPPT combiner box is equivalent to the DC/DC conversion unit in the power supply system shown in FIG. 1A and FIG. 1B. As shown in FIG. 11A and FIG. 11B, the input bus includes an input positive bus and an input negative bus.

As shown in an MPPT combiner box 1 in FIG. 11A, the voltage collected by the first voltage collection terminal of the controller 01 is a voltage between the input positive bus and the input negative bus of the MPPT combiner box 1. In FIG. 11A, "voltage detection" is used to indicate that the first voltage collection terminal collects a voltage. A voltage collection process of the first voltage collection terminal is as follows: A first voltage detector is deployed between the input positive bus and the input negative bus of the MPPT combiner box 1, and the first voltage detector reports a detected voltage to the voltage collection terminal of the controller. The current collected by the current collection terminal of the controller 01 is a current on the input positive bus of the MPPT combiner box 1. In FIG. 11A, "current detection" is used to indicate that the current collection terminal collects a current. A current collection process of the current collection terminal is as follows: A current detector is deployed on the input positive bus of the MPPT combiner box 1, and the current detector reports a detected current to the current collection terminal of the controller 01. The first voltage detector and the current detector are not shown in FIG. 11A.

In addition, as shown in FIG. 11A, the first control terminal of the controller 01 is connected to the self-lock apparatus 03, and the self-lock apparatus 03 is connected to the circuit breaker 02. The second control terminal of the controller 01 is connected to the trip apparatus 04, and the trip apparatus 04 is connected to the circuit breaker 02.

Figure 12A:
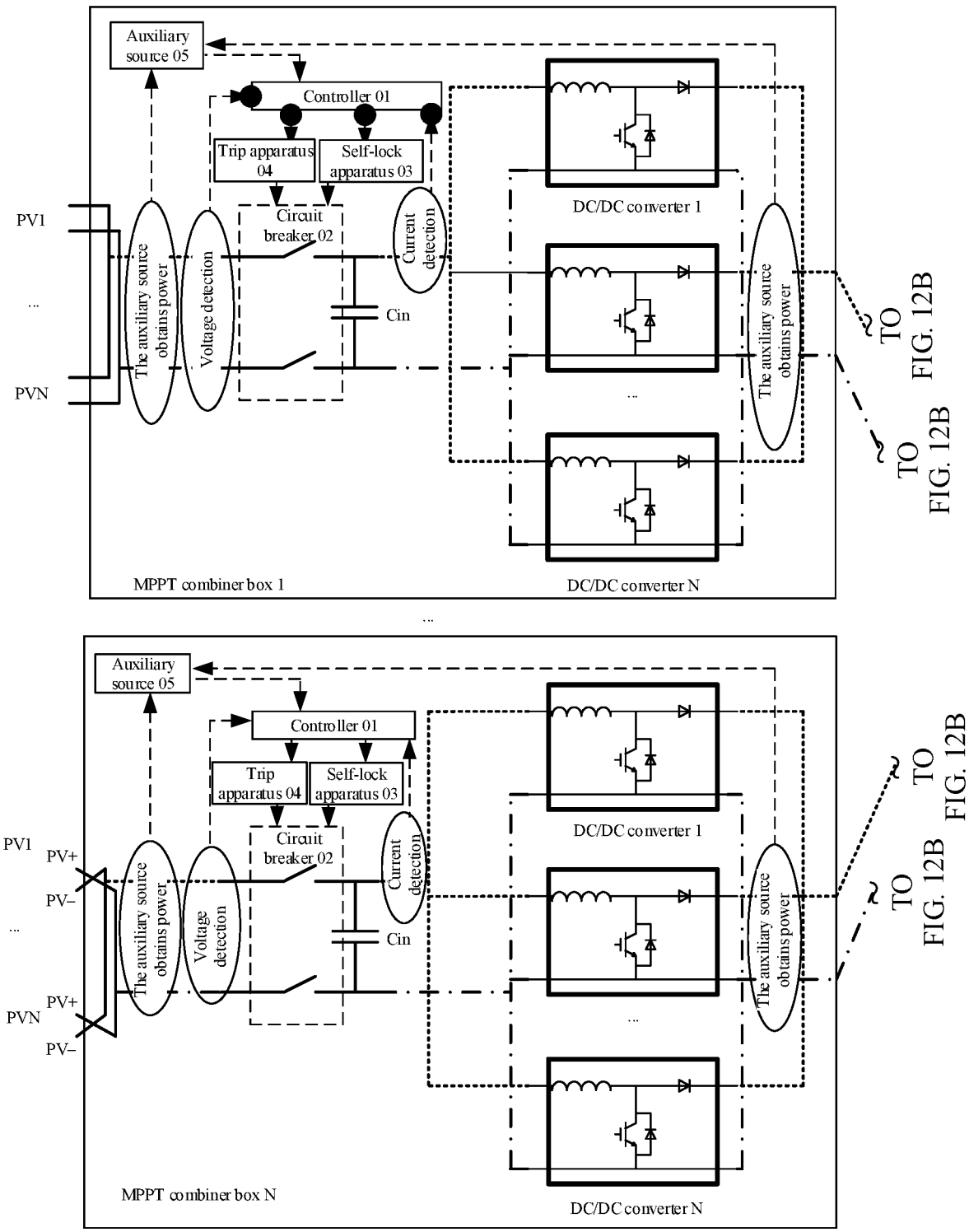
FIG. 12A and FIG. 12B are a schematic diagram of a structure of another fault isolation apparatus according to an embodiment of this application.
Figure 12B:
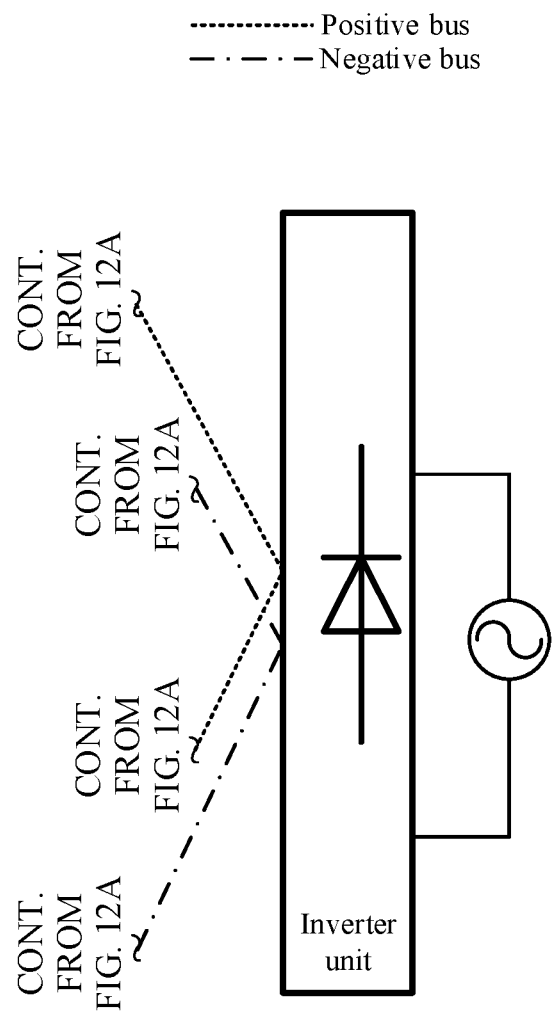

As shown in an MPPT combiner box N in FIG. 12A, after the MPPT combiner box N is connected to a photovoltaic battery panel, the circuit breaker 02 may not be first closed. Instead, the voltage collected by the first voltage collection terminal is detected. When the voltage collected by the first voltage collection terminal is a negative value, it indicates that the input positive bus and the input negative bus of the MPPT combiner box N are reversely connected. In this case, the off state of the circuit breaker 02 can be controlled to be locked. In this way, the MPPT combiner box N is not connected in series to other parallel MPPT combiner boxes, to implement fault isolation for the MPPT combiner box N. In other words, when the fault isolation apparatus shown in FIG. 8 is used in the split string inverter shown in FIG. 2A and FIG. 2B, the fault isolation apparatus may isolate an input reverse connection fault.

Figure 13A:
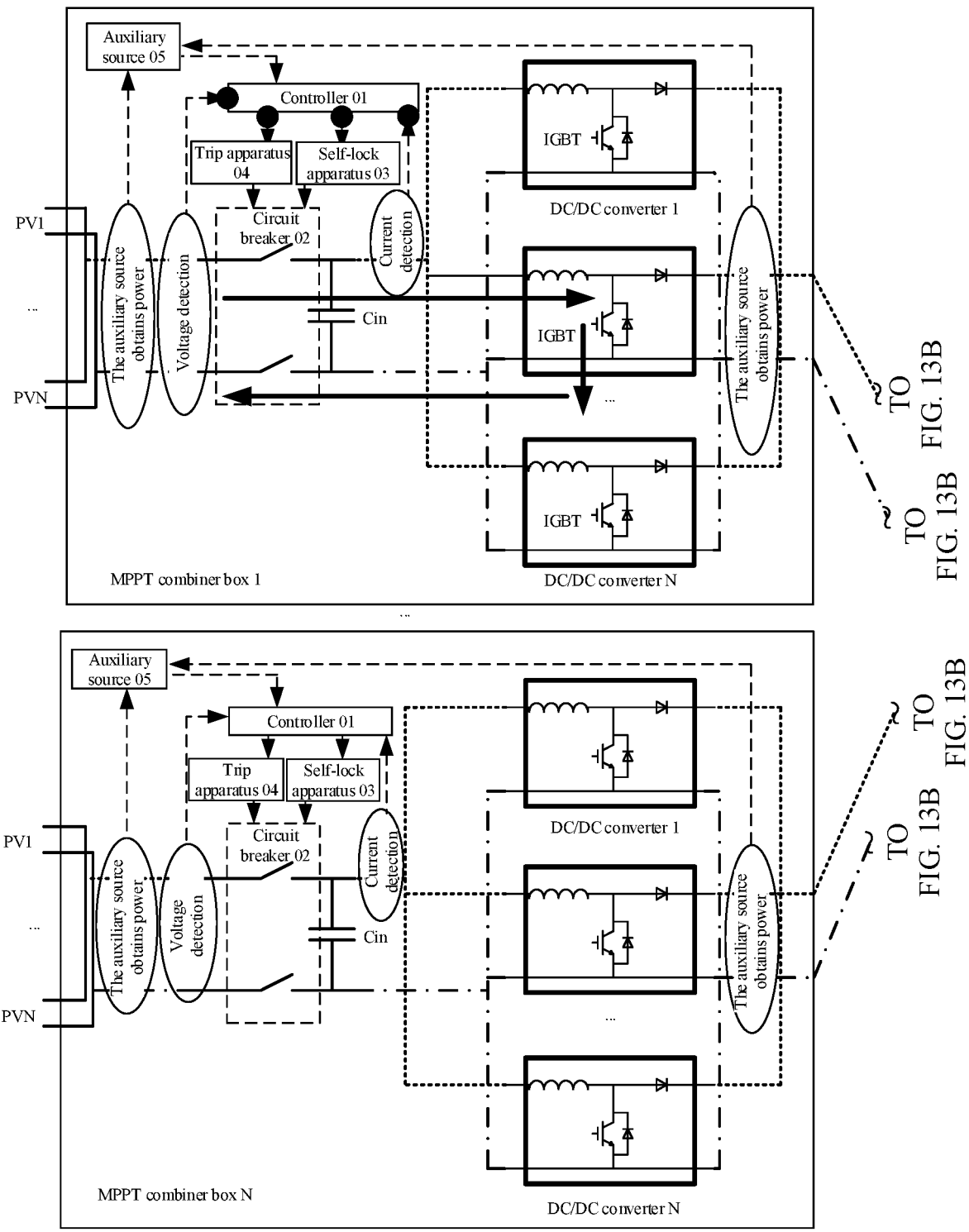
FIG. 13A and FIG. 13B are a schematic diagram of a structure of another fault isolation apparatus according to an embodiment of this application.
Figure 13B:
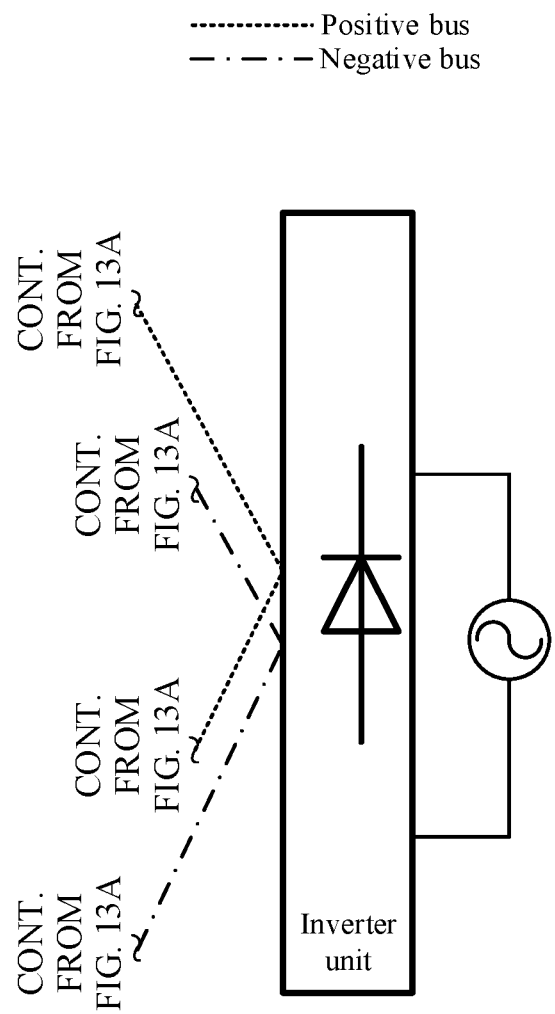

As shown in FIG. 13A, each DC/DC converter includes an insulated gate bipolar transistor (IGBT) and a reverse parallel diode. When a short-circuit fault occurs in the second DC/DC converter in the MPPT combiner box 1, for example, when a diode that is reversely connected in parallel with an IGBT in the DC/DC converter is reversely turned on, a current that is input from the photovoltaic battery panel to the DC/DC converter is returned to an output terminal of the photovoltaic battery panel by using the diode that is reversely turned on. Consequently, a short-circuit fault occurs in the IGBT. In this case, the voltage detected by the first voltage detector drops sharply, and the current detected by the current detector increases sharply. When the first voltage detector detects that the voltage drops to the voltage threshold and the current detected by the current detector is greater than the current threshold, where the voltage threshold may be marked as Vref and the current threshold may be marked as Iref, it is determined that a short-circuit fault occurs in the system. The controller 01 delivers the second instruction to the undervoltage trip apparatus 04, to control the circuit breaker 02 to be tripped to cut off a short-circuit loop, so as to avoid fault spread.

Figure 14A:
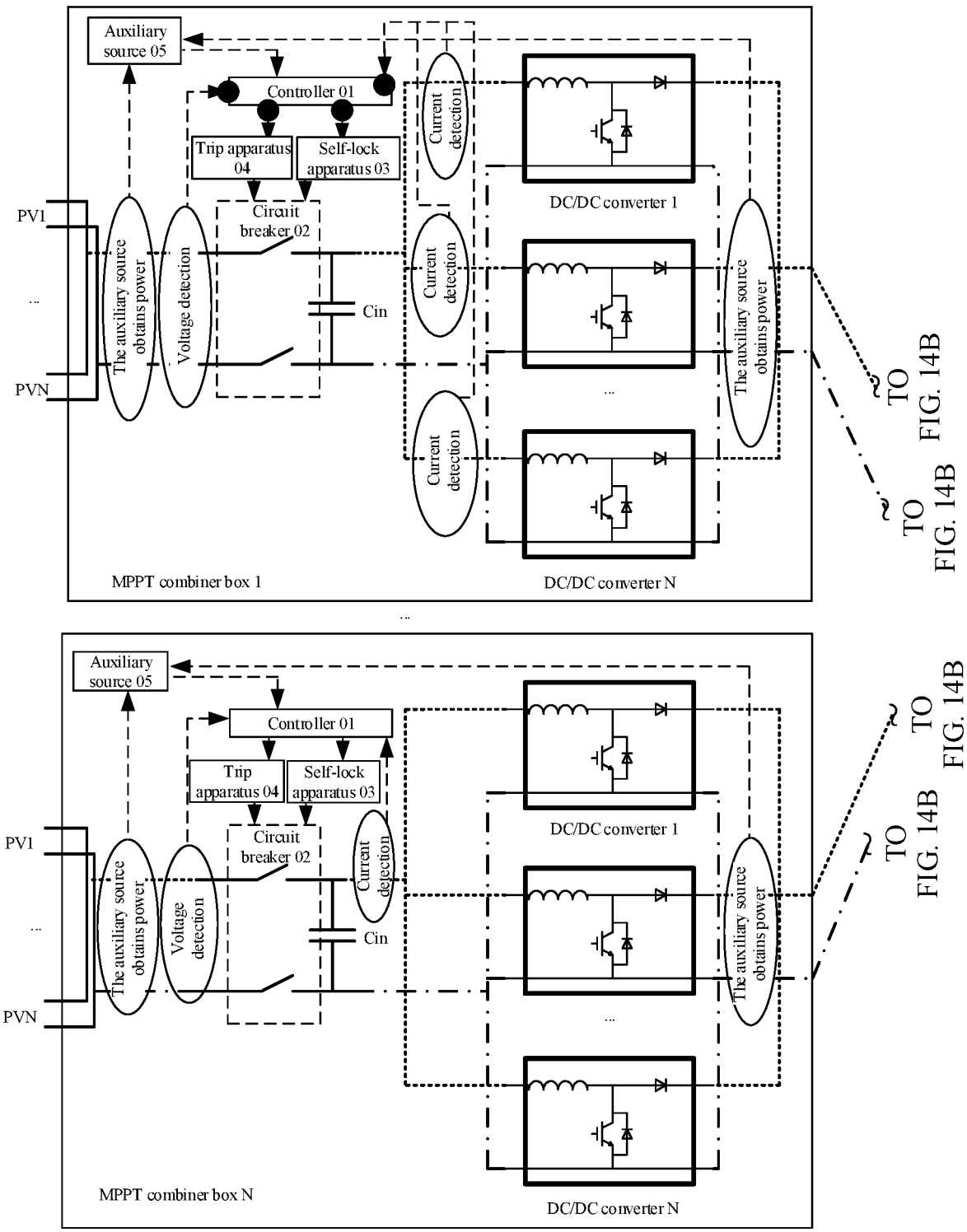
FIG. 14A and FIG. 14B are a schematic diagram of a structure of another fault isolation apparatus according to an embodiment of this application.
Figure 14B:
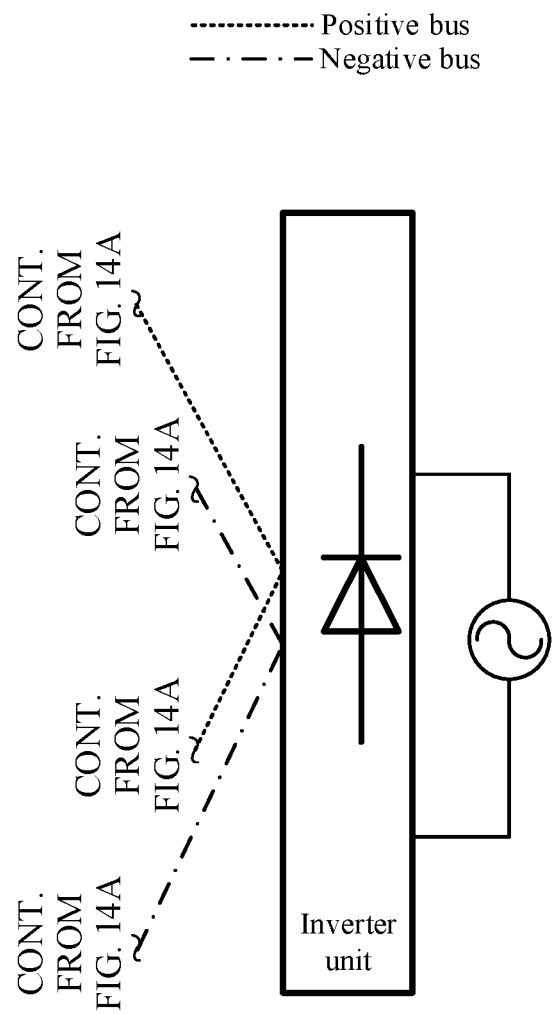

In addition, as shown in an MPPT combiner box 1 in FIG. 14A, a current detector is deployed on each DC/DC converter in a plurality of DC/DC converters included in the MPPT combiner box 1. The current detector is not shown in FIG. 14A, but is marked by using "current detection". An output terminal of each current detector is connected to the current collection terminal of the controller 02. In this case, the current collected by the current collection terminal of the controller 02 is a sum of currents detected by the current detectors.

In addition, in the MPPT combiner box 1 shown in FIG. 14A, if a current detected by a current detector increases suddenly, a DC/DC converter connected in series to the current detector may also be short-circuited. Therefore, if a current that is detected by a current detector and that is collected by the current collection terminal of the controller 02 increases suddenly, the circuit breaker apparatus may also be controlled to be tripped to cut off a short-circuit loop, so as to avoid fault spread.

In addition, as shown in the MPPT combiner box 1 in FIG. 11A, a voltage detector is deployed between an output positive bus and an output negative bus that are connected to an output terminal of the MPPT combiner box 1. In FIG. 11A, the voltage detector is not shown, but is marked by using "voltage detection" on the output positive bus and the output negative bus. Therefore, the controller 02 may further include a second voltage collection terminal. The voltage detector deployed on each of the output positive bus and the output negative bus that are connected to the output terminal of the MPPT combiner box 1 is connected to the second voltage collection terminal of the controller 01. A voltage collected by the second voltage collection terminal of the controller 01 is a voltage on the output bus connected to the MPPT combiner box 1, and a value of the voltage may be used to indicate whether output of the MPPT combiner box 1 is reversely connected, so that the controller isolates an output reverse connection fault.

FIG. 11A shows voltage detection on the output positive bus and the output negative bus only in the MPPT combiner box 1. Voltage detection may be performed on an output positive bus and an output negative bus of another MPPT combiner box. FIG. 11A does not constitute a limitation on each MPPT combiner box.

For the fault isolation apparatus shown in any one of FIG. 11A to FIG. 14B, as shown in the MPPT combiner box 1 in FIG. 11A to FIG. 14B, the apparatus further includes an auxiliary source 05. The auxiliary source 05 is separately connected to other components in the fault isolation apparatus, and is configured to supply power to the other components.

To ensure power supply reliability of the auxiliary source 05, as shown in FIG. 11A to FIG. 14B, the auxiliary source 05 may be configured to obtain power from the output bus of the MPPT combiner box, and the auxiliary source may be further configured to obtain power from the input bus of the MPPT combiner box. In other words, in this embodiment of this application, the auxiliary source is connected to the input bus connected to the input terminal of the DC/DC conversion unit, and the auxiliary source is further connected to the output bus connected to the output terminal of the DC/DC conversion unit. It is equivalent to supplying power to the auxiliary source in a manner of bidirectionally obtaining power from input and output. In this way, the auxiliary source can run reliably regardless of whether the input or the output has power. This can effectively improve reliability of the auxiliary source and ensure reliable working of the fault isolation apparatus.

In addition, when powered is supplied to the auxiliary source in the manner of bidirectionally obtaining power from input and output, for the split string inverter shown in FIG. 11A and FIG. 11B, an MPPT combiner box that is first provided is generally powered on. After the first MPPT combiner box is powered on, because output of all MPPT combiner boxes is connected in parallel, an output terminal of another MPPT combiner box can supply power to an auxiliary source of a fault isolation apparatus deployed in the another MPPT combiner box. In this way, the fault isolation apparatus in the another MPPT combiner box can detect, by using a voltage detector deployed on an output bus, whether output is reversely connected. This further improves flexibility of the fault isolation apparatus.

In the foregoing embodiments shown in FIG. 11A to FIG. 14B, the fault isolation apparatus may be integrated into any MPPT combiner box in the split string inverter shown in FIG. 2A and FIG. 2B. Therefore, this embodiment of this application further provides a direct current boost apparatus. The direct current boost apparatus includes a DC/DC conversion unit in the power supply system and the fault isolation apparatus provided in this application. The circuit breaker in the fault isolation apparatus is located on a bus connected to an input terminal of the DC/DC conversion unit.

The DC/DC conversion unit in the direct current boost apparatus may be an MPPT combiner box in FIG. 11A to FIG. 14B. A function of the direct current boost apparatus has been described in detail in the description of the fault isolation apparatus shown in FIG. 11A to FIG. 14B, and is not described in detail herein.

In addition, the MPPT combiner boxes in the split string inverter shown in FIG. 2A and FIG. 2B are mutually independent, and may be deployed in different subarrays. Therefore, in the embodiment shown in any one of FIG. 11A to FIG. 14B, auxiliary sources and controllers in the MPPT combiner boxes may be mutually independent, that is, each MPPT combiner box has an independent fault isolation apparatus.

Figure 15A:
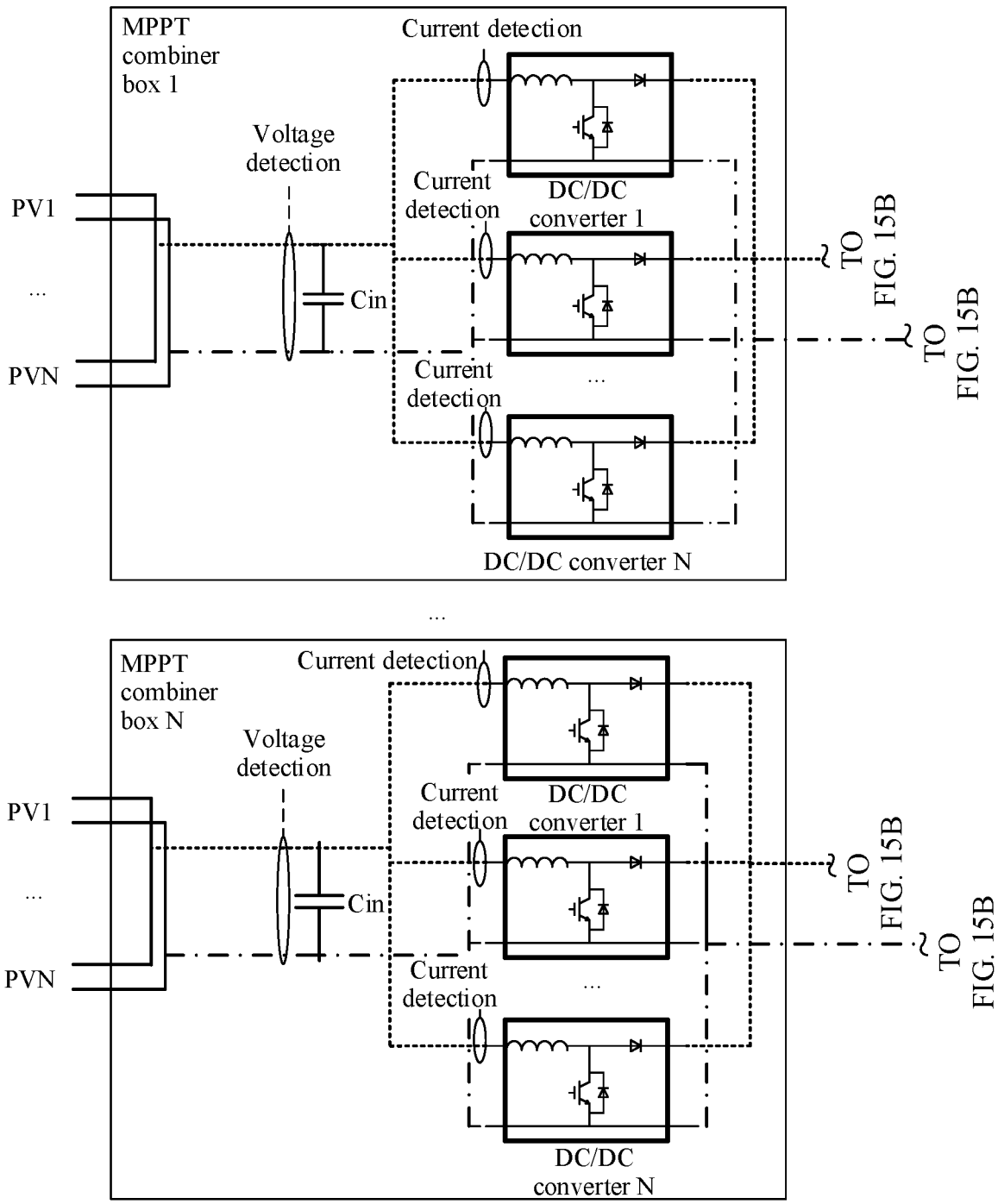
FIG. 15A and FIG. 15B are a schematic diagram of a structure of another fault isolation apparatus according to an embodiment of this application.
Figure 15B:
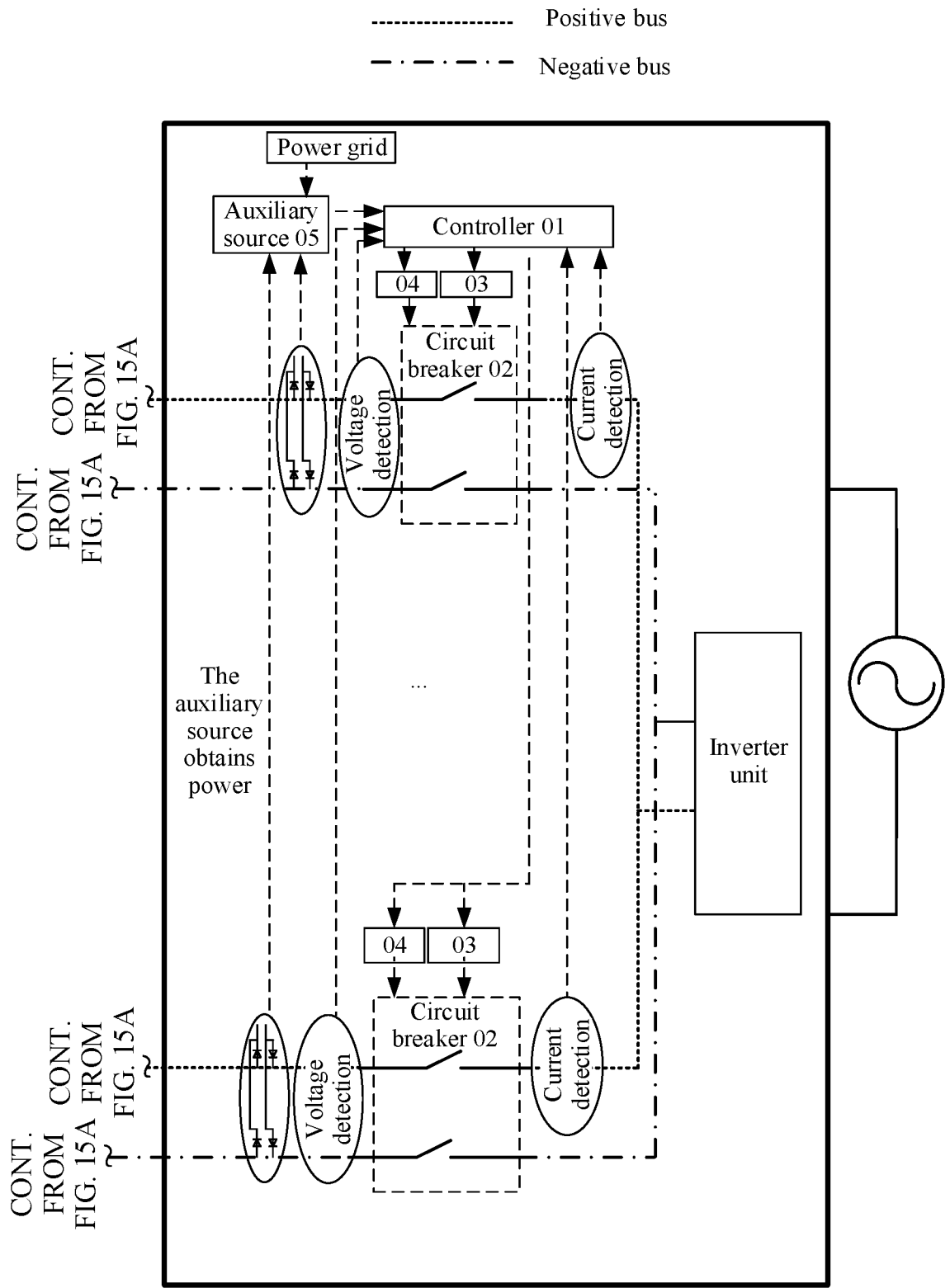

In addition, as shown in FIG. 15A and FIG. 15B, the circuit breaker 02 is located on an output bus connected to an output terminal of any MPPT combiner box, and each MPPT combiner box is equivalent to the DC/DC conversion unit in the power supply system shown in FIG. 1A and FIG. 1B. As shown in FIG. 15A and FIG. 15B, the output bus includes an output positive bus and an output negative bus. A working principle of the fault isolation apparatus is described by using an MPPT combiner box 1 in FIG. 15A as an example.

As shown in the MPPT combiner box 1 in FIG. 15A and FIG. 15B, a voltage detector is deployed on each of an output positive bus and an output negative bus that are connected to an output terminal of the MPPT combiner box 1. The voltage detector is not shown in FIG. 15B, and "voltage detection" is used to indicate a voltage detection process of the voltage detector. The first voltage collection terminal of the controller 02 is connected to the voltage detector. The voltage collected by the first voltage collection terminal of the controller 02 is a voltage reported by the voltage detector, namely, a voltage on the output bus connected to the MPPT combiner box 1. A value of the voltage may be used to indicate whether output of the MPPT combiner box 1 is reversely connected.

As shown in the MPPT combiner box 1 in FIG. 15A and FIG. 15B, a current detector is deployed on the output positive bus connected to the output terminal of the MPPT combiner box 1. The current detector is not shown in FIG. 15B, and "current detection" is used to indicate a current detection process of the current detector. The current collection terminal of the controller 02 is connected to the current detector. The current collected by the current collection terminal of the controller 02 is a current reported by the current detector, namely, a current on the output bus connected to the MPPT combiner box 1.

When a short-circuit fault occurs in the second DC/DC converter in the MPPT combiner box 1, for example, when a diode that is reversely connected in parallel with an IGBT in the DC/DC converter and a diode connected in series to the IGBT are both reversely turned on, a short-circuit fault occurs in an output side of the second DC/DC converter. In this case, the voltage collected by the first voltage collection terminal of the controller 01 drops sharply, and the current collected by the current collection terminal of the controller 01 increases sharply. When the voltage collected by the first voltage collection terminal drops to the voltage threshold and the current collected by the current collection terminal is greater than the current threshold, it is determined that a short-circuit fault occurs in the system, and the controller delivers the second instruction to the trip apparatus 04, to control the circuit breaker to be tripped to cut off a short-circuit loop, so as to avoid fault spread.

As shown in FIG. 15B, the fault isolation apparatus may also include an auxiliary source. The auxiliary source is separately connected to other components, and is configured to supply power to the other components. In this case, as shown in FIG. 15B, the auxiliary source is connected to a power grid of the power supply system, and is also connected to a bus connected to an input terminal of an inverter unit in the power supply system, so that the auxiliary source can obtain power from the power grid of the power supply system, and can also obtain power from the bus connected to the input terminal of the inverter unit in the power supply system. For the split string inverter shown in FIG. 15A and FIG. 15B, because voltages that are input from the MMPT combiner boxes to the inverter unit are generally different, after currents that are input from the MMPT combiner boxes to the inverter unit are rectified, power is supplied to the auxiliary source.

In the embodiment shown in FIG. 15A and FIG. 15B, the fault isolation apparatus may be integrated into an inverter apparatus of the split string inverter shown in FIG. 2A and FIG. 2B. Therefore, this embodiment of this application further provides an inverter apparatus. The inverter apparatus includes an inverter unit and the fault isolation apparatus provided in this embodiment of this application. An input terminal of the inverter unit is configured to be connected to one or more DC/DC conversion units in the power supply system, and the circuit breaker in the fault isolation apparatus is located on a bus connected to an output terminal of any DC/DC conversion unit.

The inverter unit may be an inverter unit of the split string inverter shown in FIG. 2A and FIG. 2B. The DC/DC conversion unit may be any MPPT combiner box in the split string inverter shown in FIG. 2A and FIG. 2B.

As shown in FIG. 15A and FIG. 15B, when the fault isolation apparatus is integrated into the inverter unit of the split string inverter shown in FIG. 2A and FIG. 2B, because the inverter unit is usually deployed in an equipment room, fault isolation apparatuses deployed on buses connected to output terminals of all MPPT combiner boxes may share a same auxiliary source and a same controller, to reduce hardware costs of the fault isolation apparatus.

In addition, in any one of the foregoing embodiments, the circuit breaker includes a first circuit breaker, and the first circuit breaker is configured to be connected to the positive bus. Optionally, the circuit breaker apparatus may further include a second circuit breaker, and the second circuit breaker is configured to be connected to the negative bus. In other words, in this application, the circuit breaker configured to perform fault isolation may be deployed on the positive bus, or may be deployed on the negative bus, and fault isolation may be implemented in either of the two cases. In addition, although a circuit breaker deployed on a single side of a bus can also cut off a current, two terminals are possibly still connected, a rear terminal is still energized, and complete fault isolation possibly cannot be implemented. Therefore, the circuit breaker 02 may also be deployed on both the positive bus and the negative bus. This is not specifically limited in this embodiment of this application.

A person of ordinary skill in the art may understand that all or a part of the steps in the embodiments may be implemented by hardware or a program instructing related hardware. The program may be stored in a non-transitory computer-readable storage medium. The storage medium may be a read-only memory, a magnetic disk, an optical disc, or the like.

The foregoing descriptions are merely exemplary embodiments of this application, but are not intended to limit this application. Any modification, equivalent replacement, or improvement made without departing from the principle of this application may fall within the protection scope of this application.

What is claimed is:

1. A fault isolation apparatus, comprising:
   a controller comprising a control terminal, a first voltage collection terminal, and a current collection terminal; and
   a circuit breaker, wherein the circuit breaker is connected to the control terminal of the controller;
   wherein the circuit breaker is located on a bus, wherein the circuit breaker is configured such that the bus is connected to or disconnected from a direct current/direct current (DC/DC) conversion unit in a power supply system based on the circuit breaker being on or off, respectively;
   wherein the first voltage collection terminal of the controller is configured to collect a voltage on the bus, and the current collection terminal of the controller is configured to collect a current on the bus; and
   wherein the control terminal of the controller is configured to turn the circuit breaker off based on:
      the voltage collected by the first voltage collection terminal being a negative value; or
      the voltage collected by the first voltage collection terminal being lower than a voltage threshold and the current collected by the current collection terminal being higher than a current threshold;
   wherein the apparatus further comprises: a self-lock apparatus of the circuit breaker, wherein the self-lock apparatus comprises an input terminal and an output terminal;
   wherein the input terminal of the self-lock apparatus is connected to the control terminal of the controller, and the output terminal of the self-lock apparatus is connected to the circuit breaker; and
   wherein the control terminal of the controller is configured to send an instruction to the input terminal of the self-lock apparatus to instruct the self-lock apparatus to control the off state of the circuit breaker to be locked based on the circuit breaker being off and the voltage collected by the first voltage collection terminal being a negative value.

2. The apparatus according to claim 1, wherein the apparatus further comprises:
   a trip apparatus of the circuit breaker, wherein the trip apparatus comprises an input terminal and an output terminal;
   wherein the input terminal of the trip apparatus is connected to the control terminal of the controller, and the output terminal of the trip apparatus is connected to the circuit breaker; and
   wherein the control terminal of the controller is configured to send an instruction to the input terminal of the trip apparatus to instruct the trip apparatus to control the circuit breaker to be switched from a close state to the off state based on the voltage collected by the first voltage collection terminal being lower than the voltage threshold and the current collected by the current collection terminal being higher than the current threshold.

3. The apparatus according to claim 1, wherein:
   the first voltage collection terminal of the controller is configured to be connected to a voltage detector deployed on the bus; and
   the voltage collected by the first voltage collection terminal of the controller is a voltage reported by the voltage detector on the bus.

4. The apparatus according to claim 1, wherein:
   the current collection terminal of the controller is configured to be connected to a current detector deployed on the bus; and
   the current collected by the current collection terminal of the controller is a current reported by the current detector on the bus.

5. The apparatus according to claim 1, wherein:
   the current collection terminal of the controller is configured to be connected to a current detector deployed on each DC/DC converter in a plurality of DC/DC converters comprised in the DC/DC conversion unit; and
   the current collected by the current collection terminal of the controller is a sum of currents reported by the current detectors on all the DC/DC converters in the plurality of DC/DC converters.

6. The apparatus according to claim 5, wherein the bus is an output bus connected to an output terminal of the DC/DC conversion unit.

7. The apparatus according to claim 6, wherein the apparatus further comprises:
   an auxiliary source, separately connected to other components in the apparatus, configured to supply power to the other components;
   wherein the auxiliary source is configured to be connected to a power grid of the power supply system; and
   wherein the auxiliary source is further configured to be connected to an input bus connected to an input terminal of an inverter unit in the power supply system.

8. The apparatus according to claim 1, wherein the bus is an input bus connected to an input terminal of the DC/DC conversion unit.

9. The apparatus according to claim 8, wherein the controller further comprises;
   a second voltage collection terminal configured to collect a voltage on an output bus connected to an output terminal of the DC/DC conversion unit; and
   wherein the control terminal of the controller is further configured to turn the circuit breaker off based on the voltage collected by the second voltage collection terminal being a negative value.

10. The apparatus according to claim 8, wherein the apparatus further comprises:
    an auxiliary source, separately connected to other components in the apparatus, configured to supply power to the other components;

wherein the auxiliary source is configured to be connected to the input bus; and wherein the auxiliary source is further configured to be connected to an output bus connected to an output terminal of the DC/DC conversion unit.

11. A direct current boost apparatus, wherein the direct current boost apparatus comprises:
   the DC/DC conversion unit in the power supply system; and
   the fault isolation apparatus according to claim 1;
   wherein the bus is connected to an input terminal of the DC/DC conversion unit.

12. An inverter apparatus, wherein the inverter apparatus comprises:
   an inverter unit; and
   a fault isolation apparatus, comprising:
      a controller comprising a control terminal, a first voltage collection terminal, and a current collection terminal; and
      a circuit breaker, wherein the circuit breaker is connected to the control terminal of the controller;
   wherein the circuit breaker is located on a bus, wherein the circuit breaker is configured such that the bus is connected to or disconnected from a direct current/direct current (DC/DC) conversion unit in a Power supply system based on the circuit breaker being on or off, respectively;
   wherein the first voltage collection terminal of the controller is configured to collect a voltage on the bus, and the current collection terminal of the controller is configured to collect a current on the bus; and
   wherein the control terminal of the controller is configured to turn the circuit breaker off based on:
      the voltage collected by the first voltage collection terminal being a negative value; or
      the voltage collected by the first voltage collection terminal being lower than a voltage threshold and the current collected by the current collection terminal being higher than a current threshold;
   wherein the apparatus further comprises: a self-lock apparatus of the circuit breaker, wherein the self-lock apparatus comprises an input terminal and an output terminal;
   wherein the input terminal of the self-lock apparatus is connected to the control terminal of the controller, and the output terminal of the self-lock apparatus is connected to the circuit breaker;
   wherein the control terminal of the controller is configured to send an instruction to the input terminal of the self-lock apparatus to instruct the self-lock apparatus to control the off state of the circuit breaker to be locked based on the circuit breaker being off and the voltage collected by the first voltage collection terminal being a negative value; and
   wherein an input terminal of the inverter unit is configured to be connected to one or more DC/DC conversion units in the power supply system, and the bus is connected to an output terminal of a respective DC/DC conversion unit of the one or more DC/DC conversion units.

13. A fault isolation method for a power supply system, comprising:
   collecting, by a first voltage collection terminal of a controller, a voltage on a bus on which a circuit breaker is located; and
   collecting, by a current collection terminal of the controller, a current on the bus;
   based on the voltage collected by the first voltage collection terminal being a negative value, or based on the voltage collected by the first voltage collection terminal being lower than a voltage threshold and the current collected by the current collection terminal being higher than a current threshold, turning off the circuit breaker to disconnect the bus from a direct current/direct current (DC/DC) conversion unit in the power supply system; and
   turning on the circuit breaker to connect the bus to the DC/DC conversion unit in the power supply system;
   wherein the method further comprises: based on the circuit breaker being off and the voltage collected by the first voltage collection terminal being a negative value, sending an instruction to an input terminal of a self-lock apparatus to instruct the self-lock apparatus to control the off state of the circuit breaker to be locked, wherein the input terminal of the self-lock apparatus is connected to a control terminal of the controller, and an output terminal of the self-lock apparatus is connected to the circuit breaker.

14. The method according to claim 13, wherein the method further comprises:
   based on the voltage collected by the first voltage collection terminal being lower than the voltage threshold and the current collected by the current collection terminal being higher than the current threshold, sending an instruction to an input terminal of a trip apparatus to instruct the trip apparatus to control the circuit breaker to be switched off, wherein the input terminal of the trip apparatus is connected to the control terminal of the controller, and an output terminal of the trip apparatus is connected to the circuit breaker.

* * * * *

UNITED STATES PATENT AND TRADEMARK OFFICE
CERTIFICATE OF CORRECTION

PATENT NO. : 12,095,256 B2  
APPLICATION NO. : 17/589316  
DATED : September 17, 2024  
INVENTOR(S) : Zhang et al.

Page 1 of 1

It is certified that error appears in the above-identified patent and that said Letters Patent is hereby corrected as shown below:

In the Claims

Claim 12: Column 19, Line 25: "direct current (DC/DC) conversion unit in a Power" should read as -- direct current (DC/DC) conversion unit in a power --.

Signed and Sealed this  
Sixth Day of May, 2025

Coke Morgan Stewart  
*Acting Director of the United States Patent and Trademark Office*